United States Patent
Dolan

(10) Patent No.: US 8,010,622 B2
(45) Date of Patent: Aug. 30, 2011

(54) SYSTEM AND METHOD OF USER DEFINITION OF AND PARTICIPATION IN COMMUNITIES AND MANAGEMENT OF INDIVIDUAL AND COMMUNITY INFORMATION AND COMMUNICATION

(75) Inventor: Mihael R. Dolan, Chicago, IL (US)

(73) Assignee: Michael R. Dolan

( * ) Notice: Subject to any disclaimer, the term of this patent is extended or adjusted under 35 U.S.C. 154(b) by 331 days.

(21) Appl. No.: 11/757,155

(22) Filed: Jun. 1, 2007

(65) Prior Publication Data
US 2008/0244020 A1    Oct. 2, 2008

Related U.S. Application Data

(60) Provisional application No. 60/908,491, filed on Mar. 28, 2007.

(51) Int. Cl.
*G06F 15/17* (2006.01)

(52) U.S. Cl. ....................................................... 709/217
(58) Field of Classification Search ................... 709/217
See application file for complete search history.

(56) References Cited

U.S. PATENT DOCUMENTS

| | | | |
|---|---|---|---|
| 2003/0158855 A1* | 8/2003 | Farnham et al. | 707/102 |
| 2007/0255785 A1* | 11/2007 | Hayashi et al. | 709/204 |
| 2008/0040474 A1* | 2/2008 | Zuckerberg et al. | 709/224 |
| 2008/0104679 A1* | 5/2008 | Craig | 726/4 |
| 2008/0133716 A1* | 6/2008 | Rao et al. | 709/220 |
| 2008/0134054 A1* | 6/2008 | Clark et al. | 715/753 |

* cited by examiner

*Primary Examiner* — Jeffrey Pwu
*Assistant Examiner* — Shripal K Khajuria
(74) *Attorney, Agent, or Firm* — Steptoe & Johnson LLP

(57) ABSTRACT

A set of systems and methods that improve the means by which its users can define and participate in communities and by which users can manage their individual information and communication as well as that of their communities.

1 Claim, 38 Drawing Sheets

SYSTEM AND METHOD OF USER DEFINITION OF AND PARTICIPATION IN COMMUNITIES AND MANAGEMENT OF INDIVIDUAL AND COMMUNITY INFORMATION AND COMMUNICATION IN AN EMBODIMENT

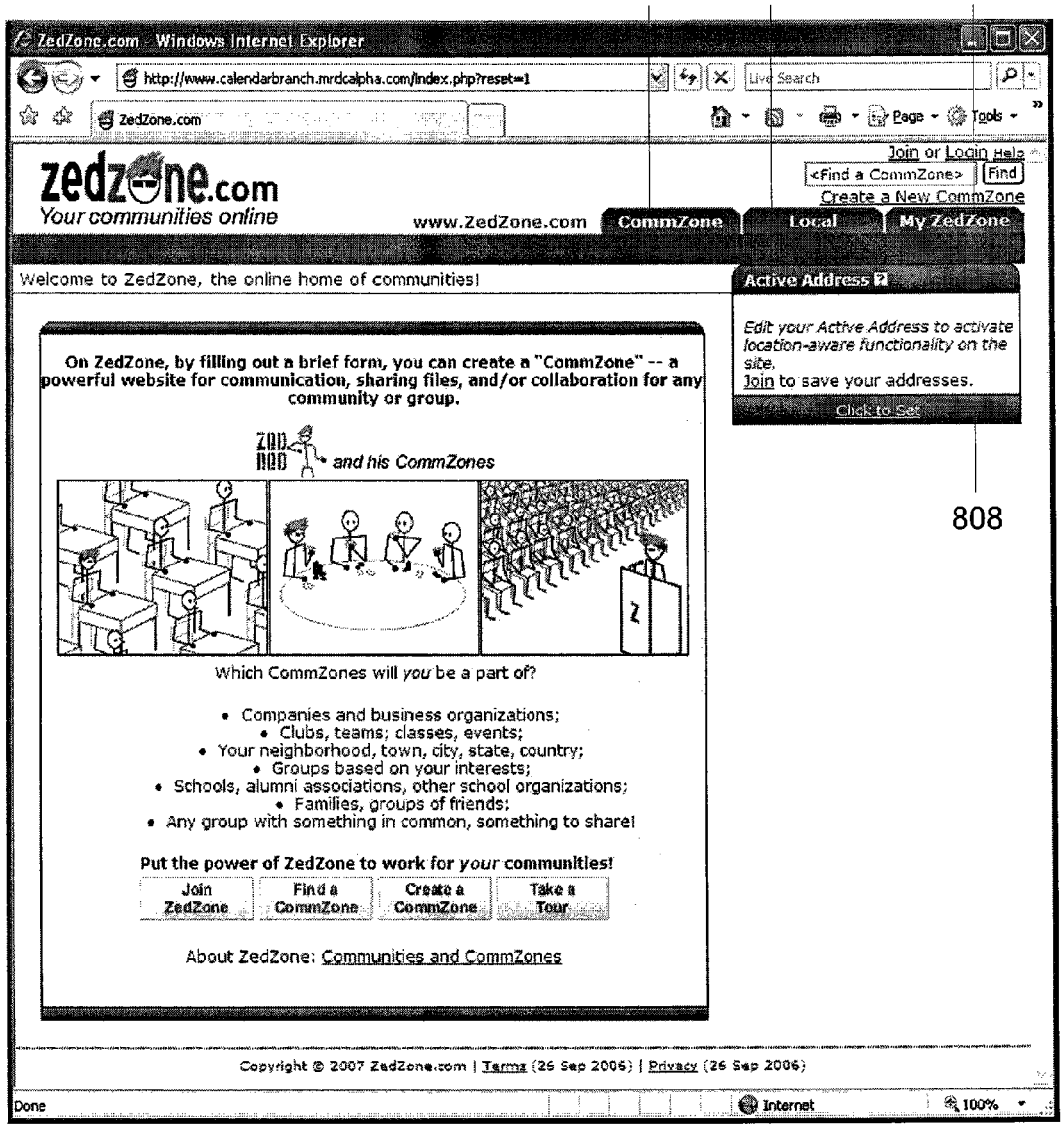
FIG. 8A: ZEDZONE.COM HOME PAGE

FIG. 8B: ZEDZONE.COM HOME PAGE

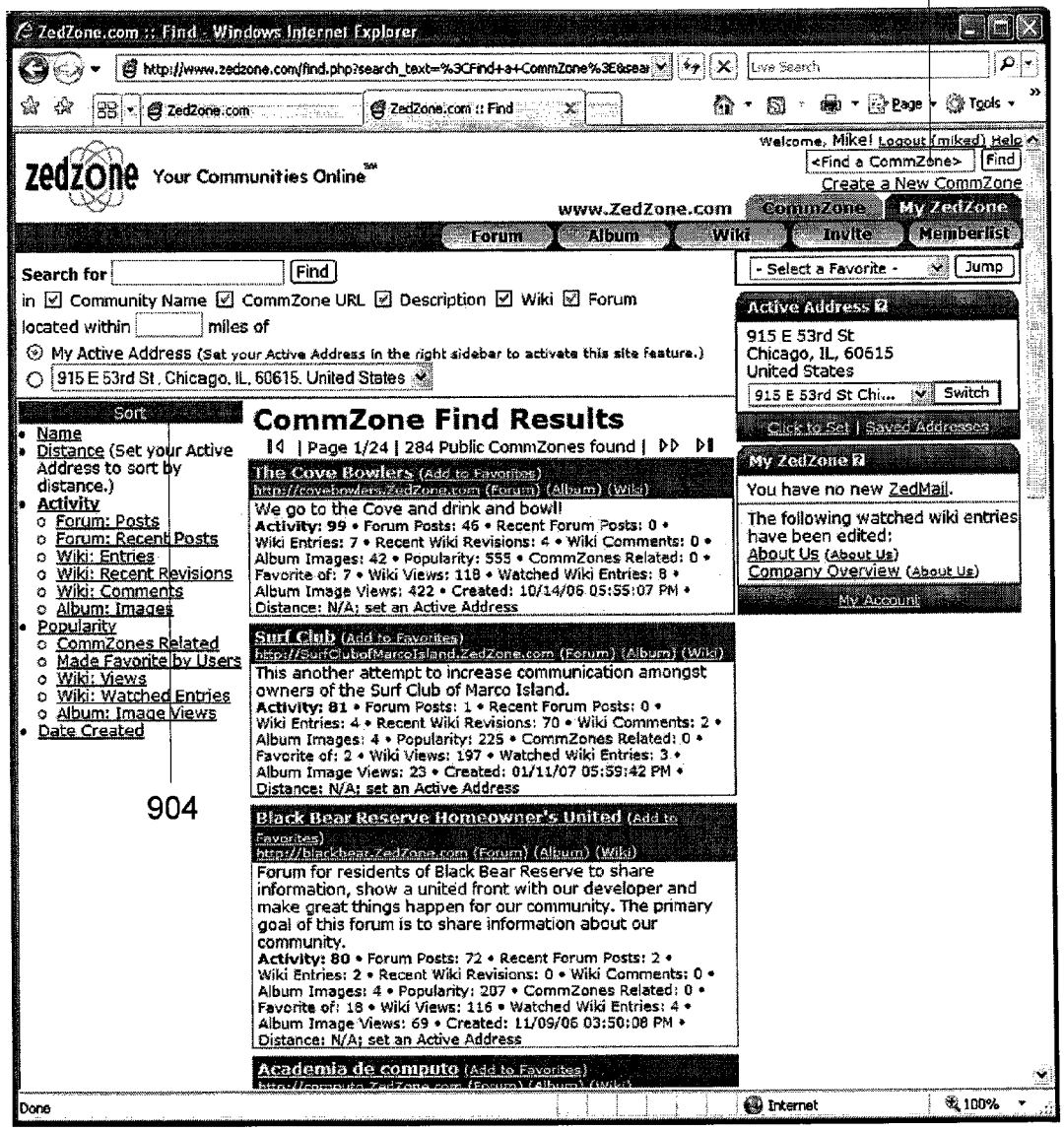
FIG. 9: FIND A COMMZONE

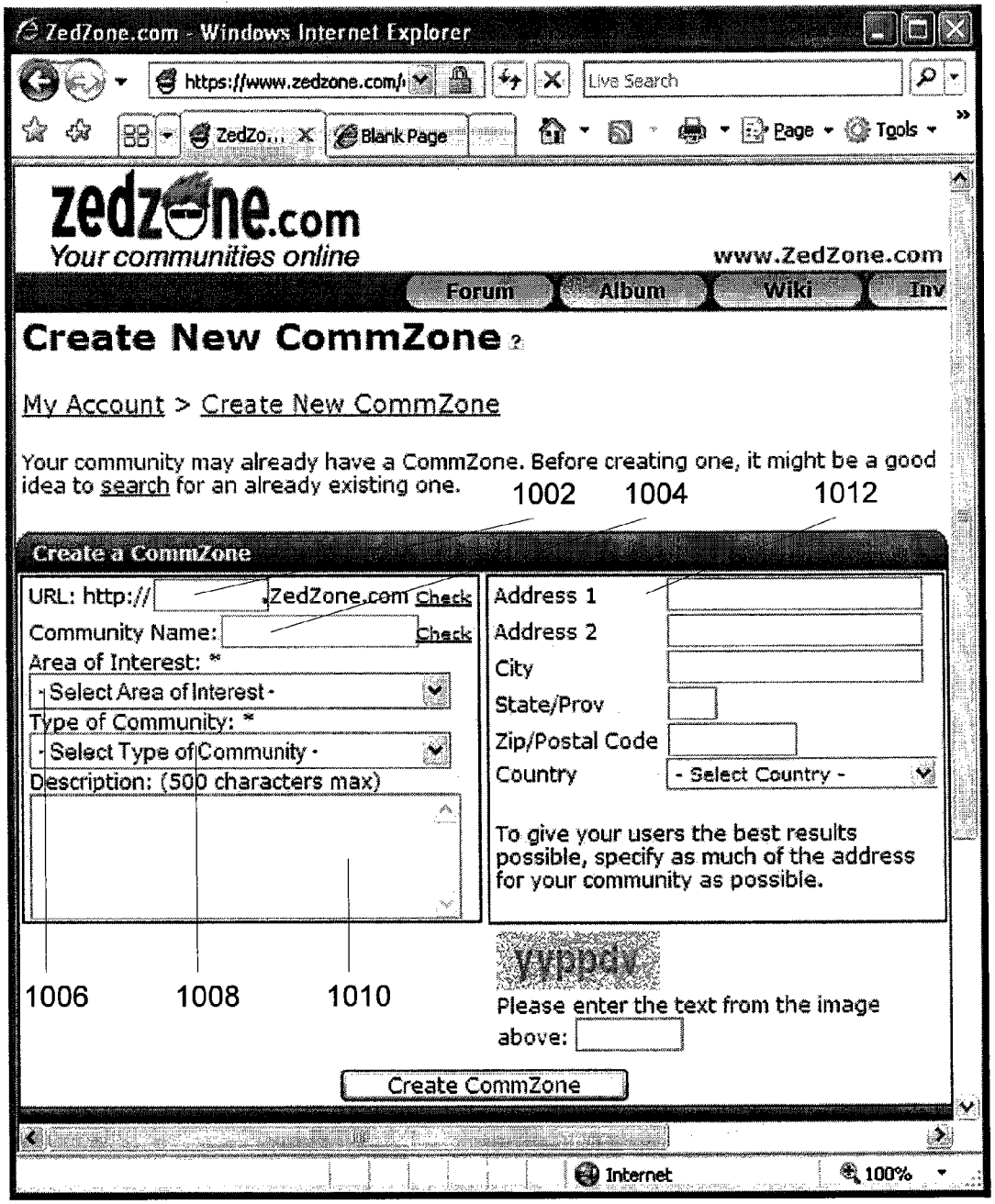
FIG. 10: CREATE A COMMZONE

FIGS. 11A-B: USER SPECIFICATION OF ACTIVE ADDRESS 1/3

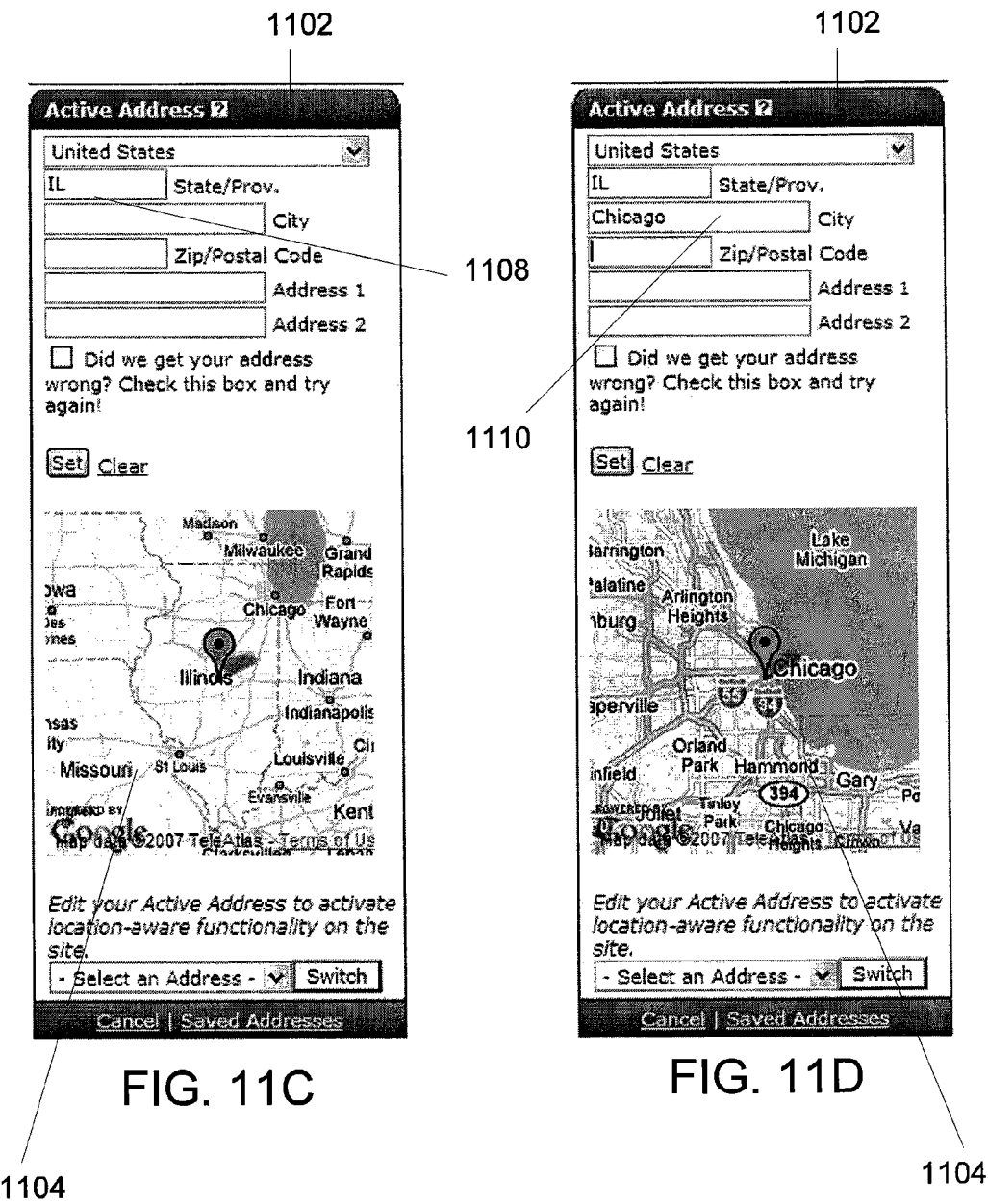
FIGS. 11C-D: USER SPECIFICATION OF ACTIVE ADDRESS 2/3

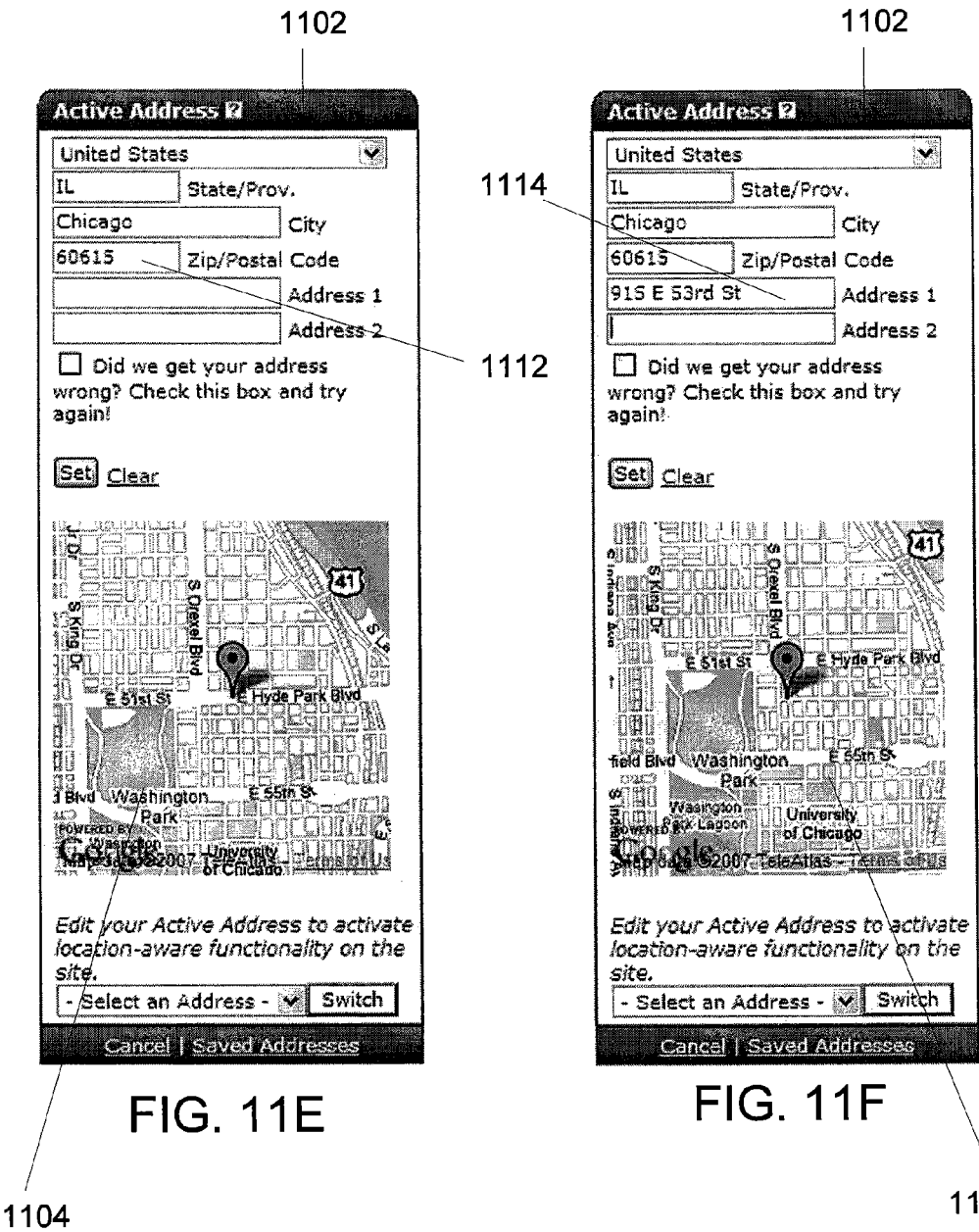
FIGS. 11E-F: USER SPECIFICATION OF ACTIVE ADDRESS 3/3

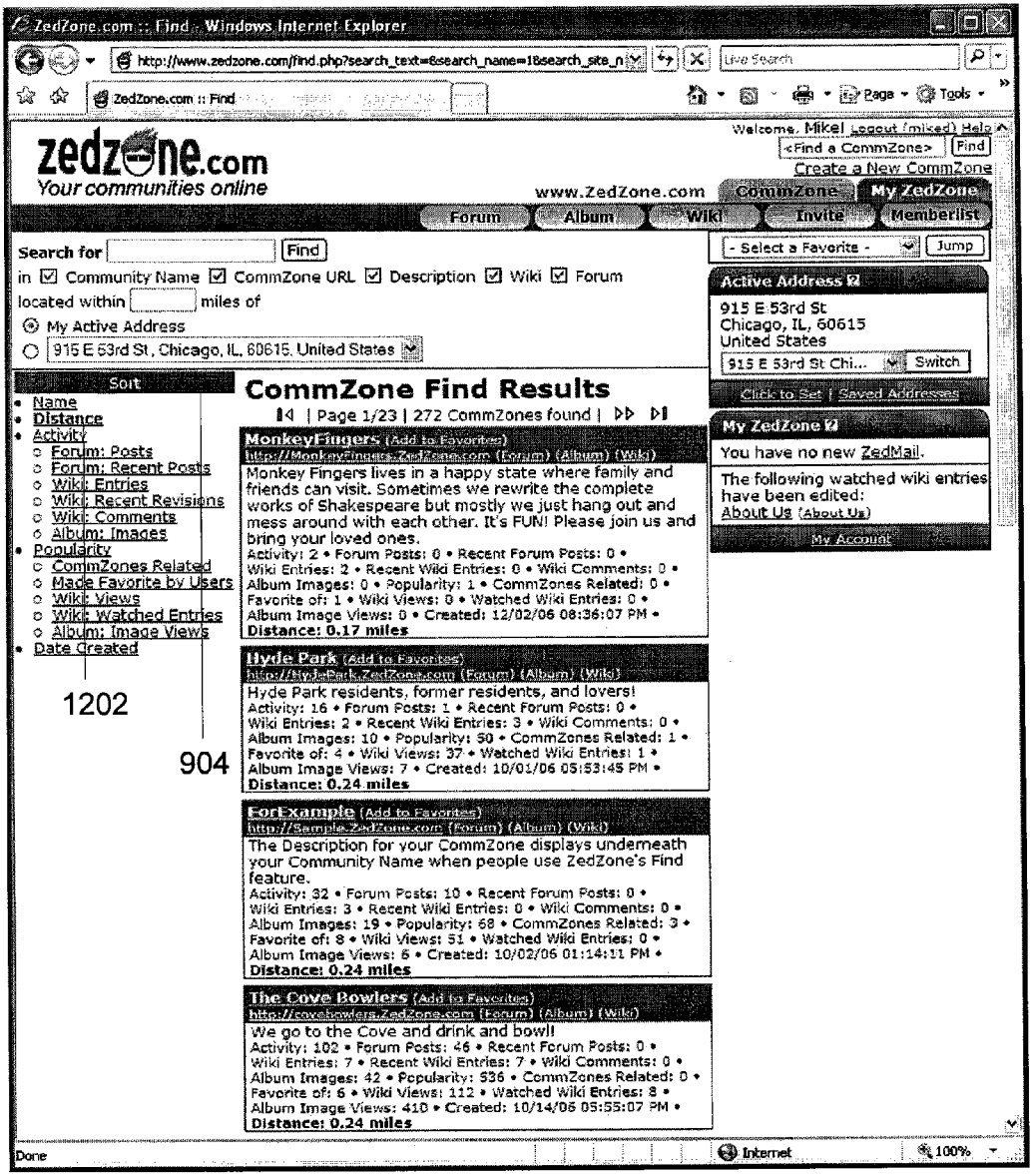
FIG. 12A: USE OF ACTIVE ADDRESS IN FIND A COMMZONE

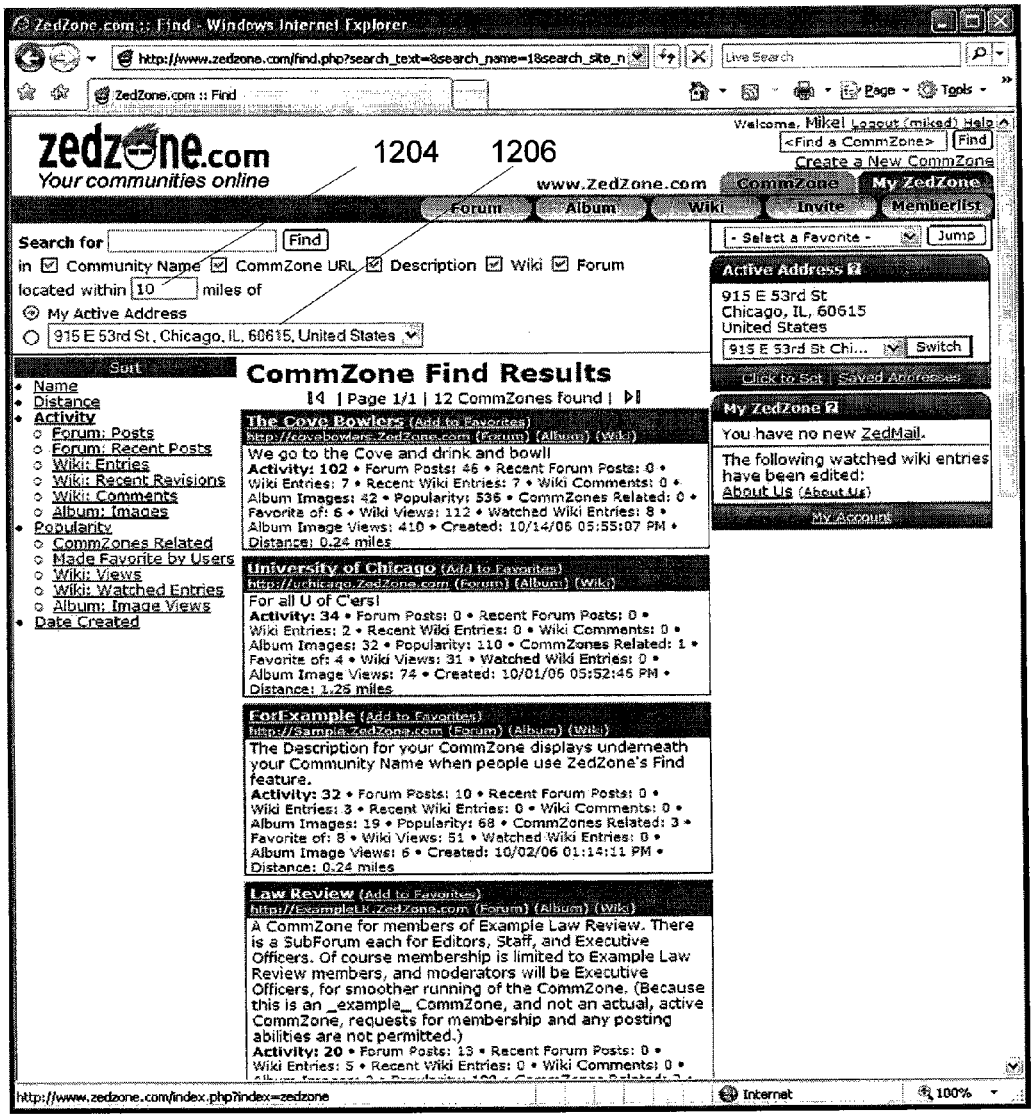
FIG. 12B: USE OF ACTIVE ADDRESS AND A SEARCH RADIUS IN FIND A COMMZONE

1208

FIG. 12C: USE OF ACTIVE ADDRESS IN
THE MARKETPLACE

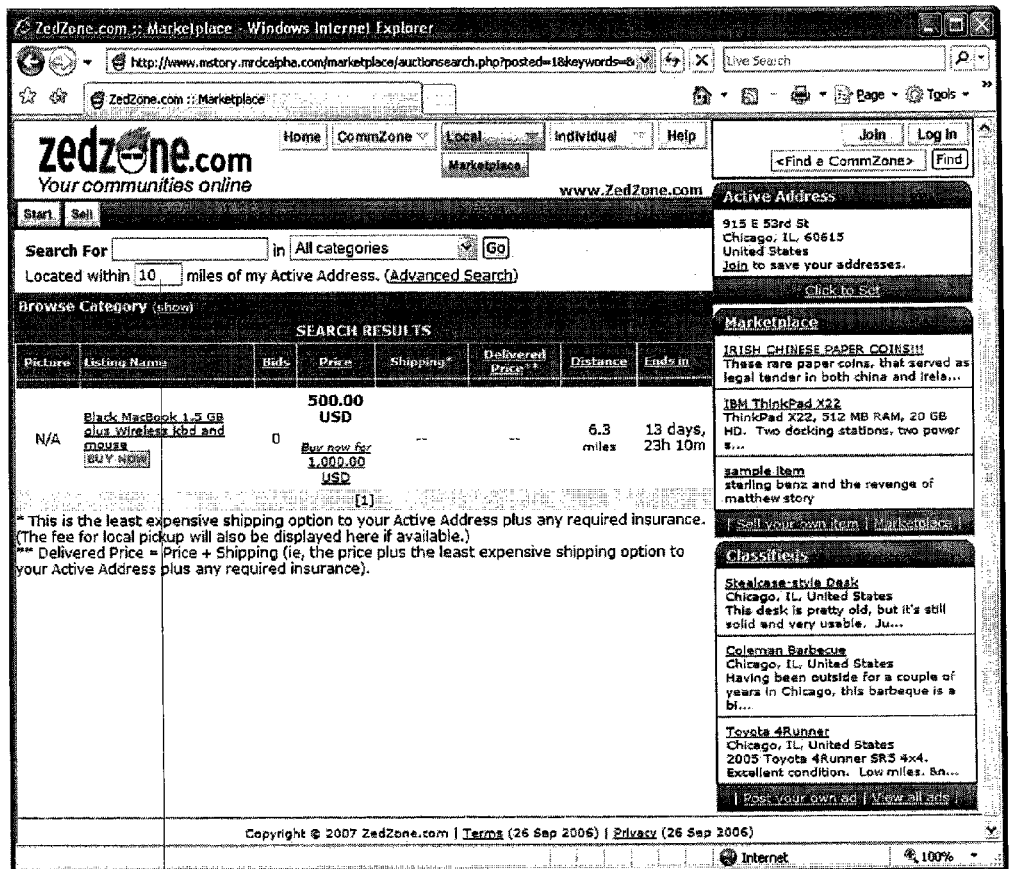
1210
FIG. 12D: USE OF ACTIVE ADDRESS AND A SEARCH RADIUS IN THE MARKETPLACE

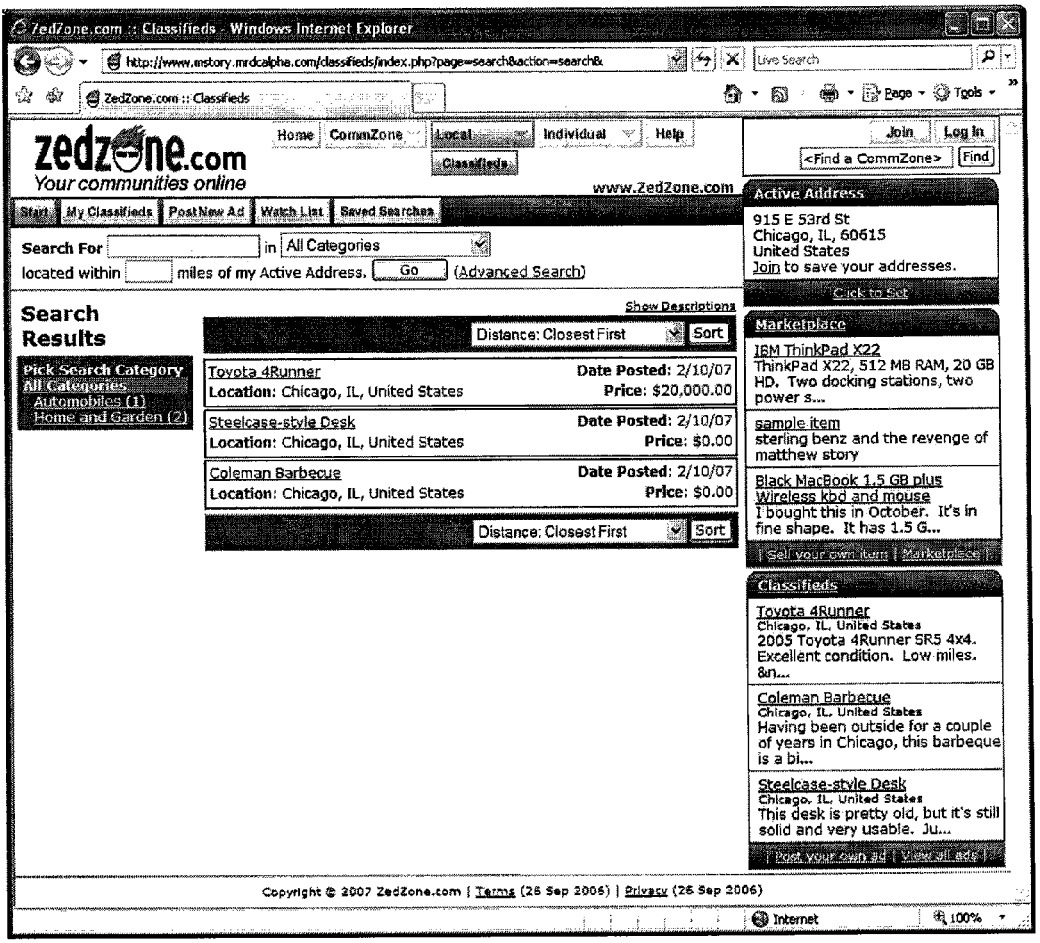
FIG. 12E: USE OF ACTIVE ADDRESS IN CLASSIFIEDS

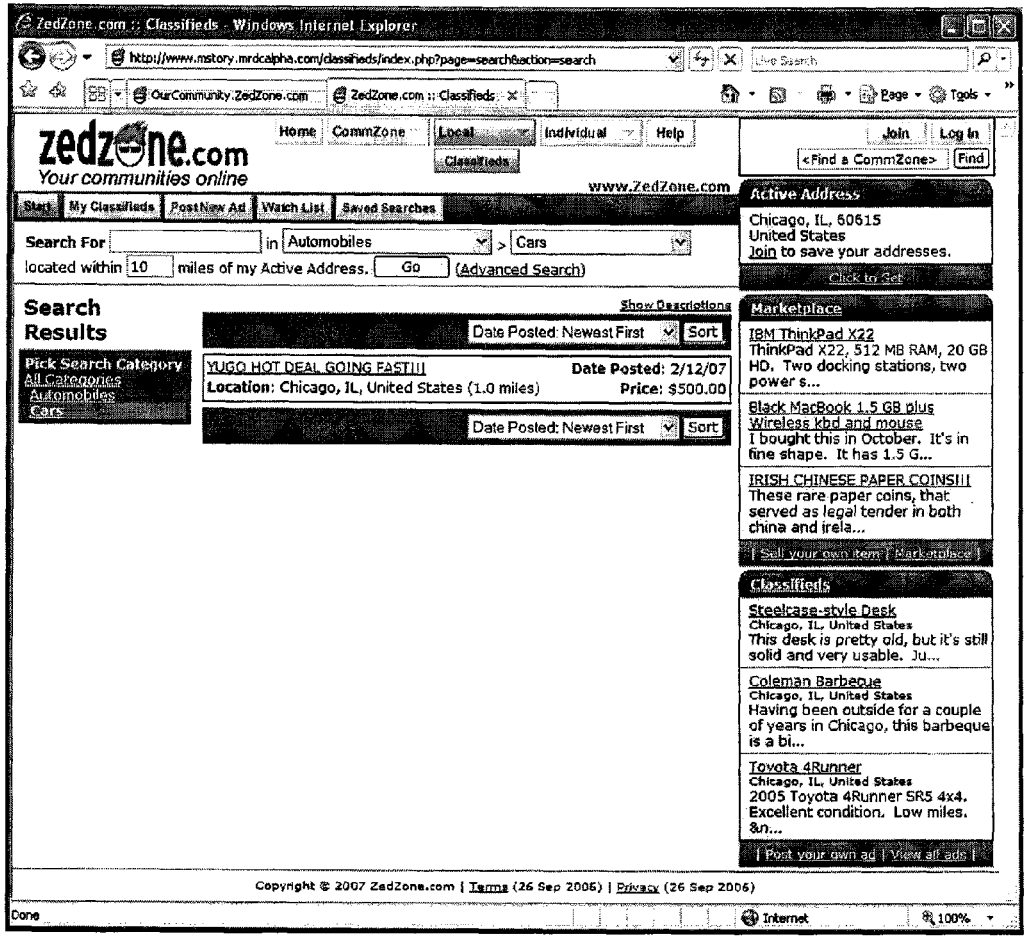
FIG. 12F: USE OF ACTIVE ADDRESS AND A SEARCH RADIUS IN CLASSIFIEDS

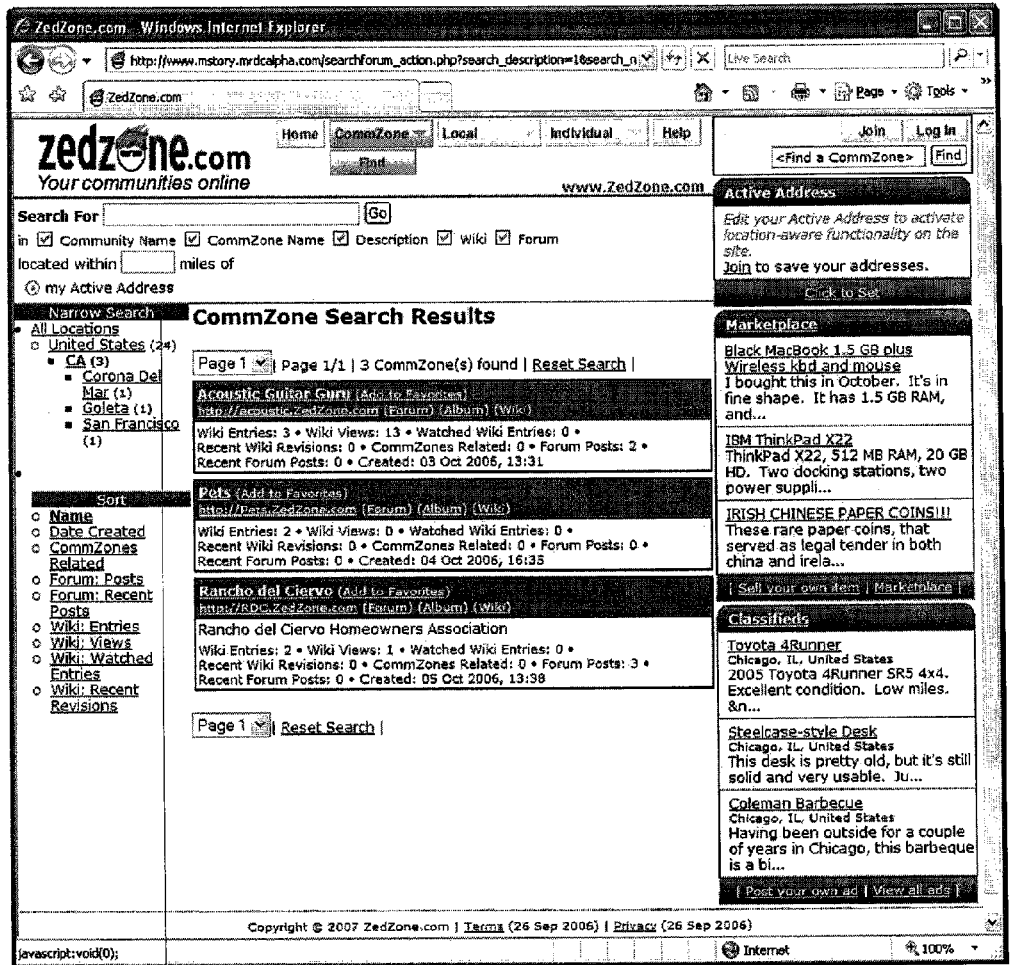
1212
FIG. 12G: USE OF SPECIFICATION OF GEOGRAPHICAL AREA IN FIND COMMUNITY WEBSITES

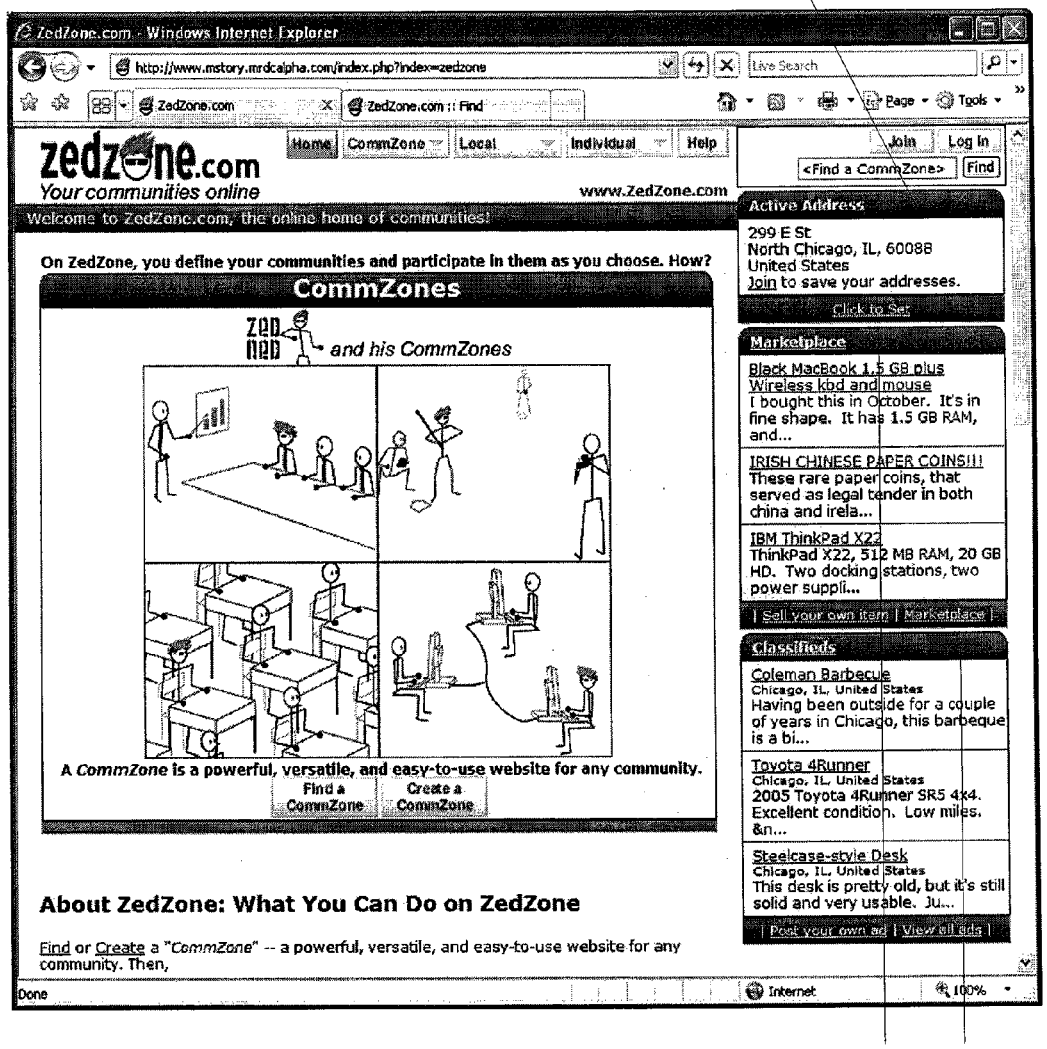
FIG. 13: INTEGRATION OF ACTIVE ADDRESS, MARKETPLACE, AND CLASSIFIEDS IN RIGHT SIDEBAR

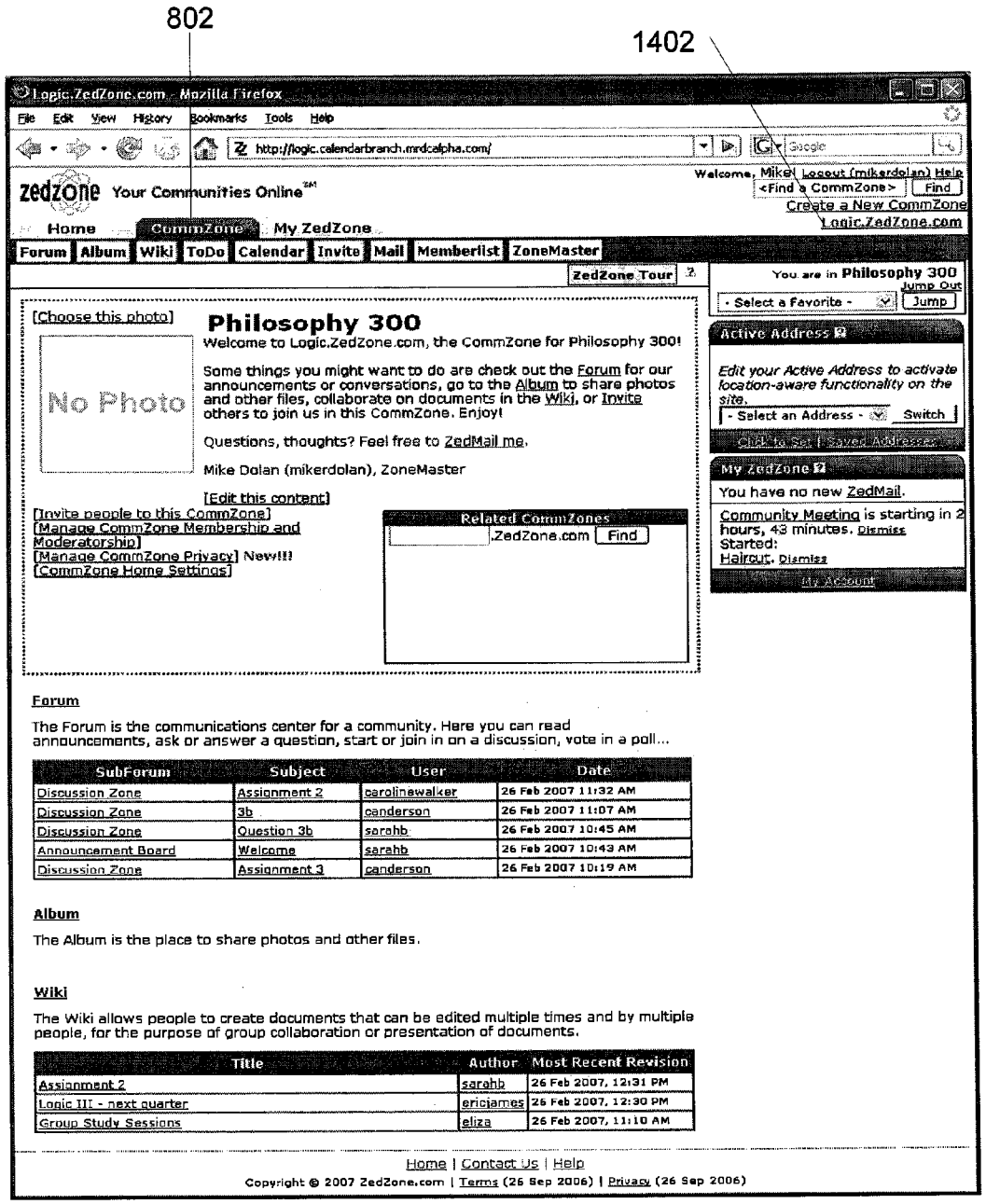
FIG. 14A: THE HOME PAGE OF A COMMZONE

FIG. 14B: THE HOME PAGE OF A COMMZONE

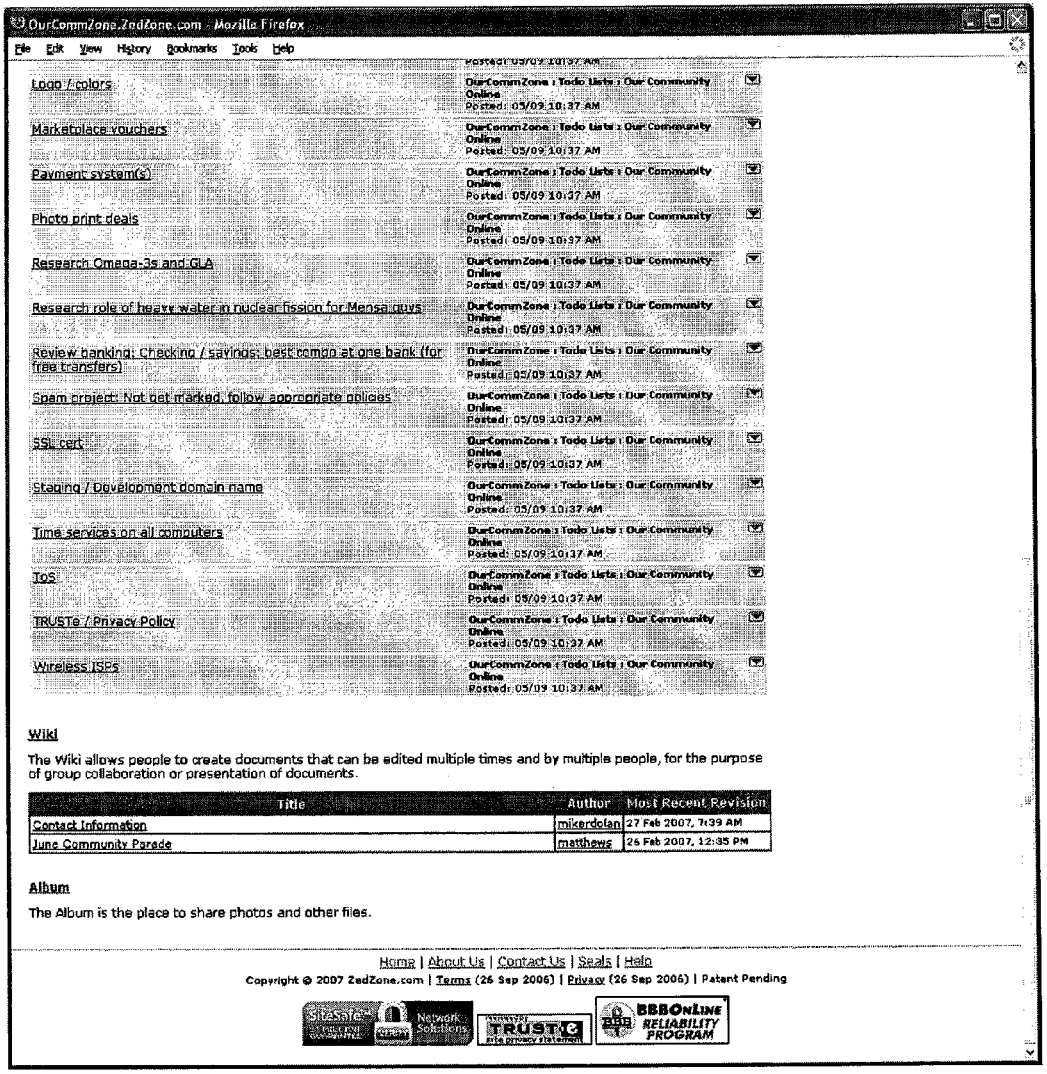
FIG. 14C: THE HOME PAGE OF A COMMZONE

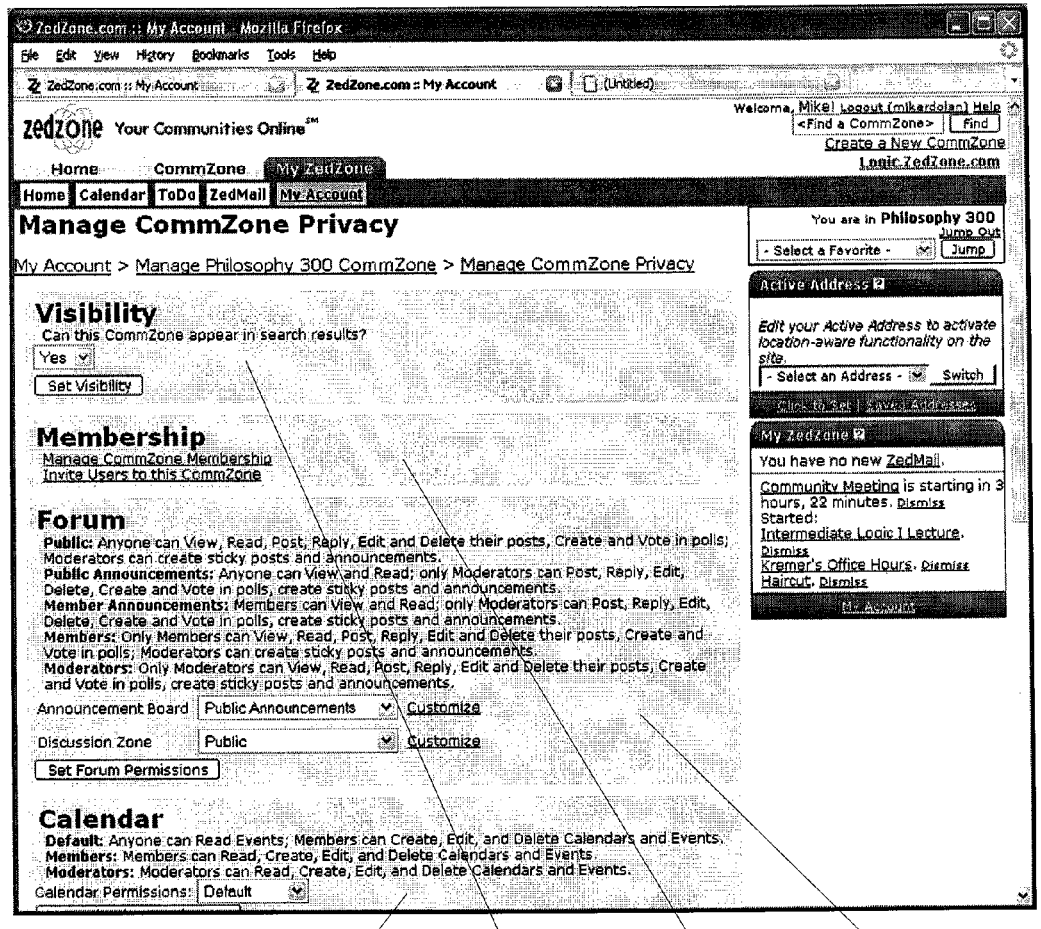
FIG. 15A: MANAGE COMMZONE PRIVACY
1/2

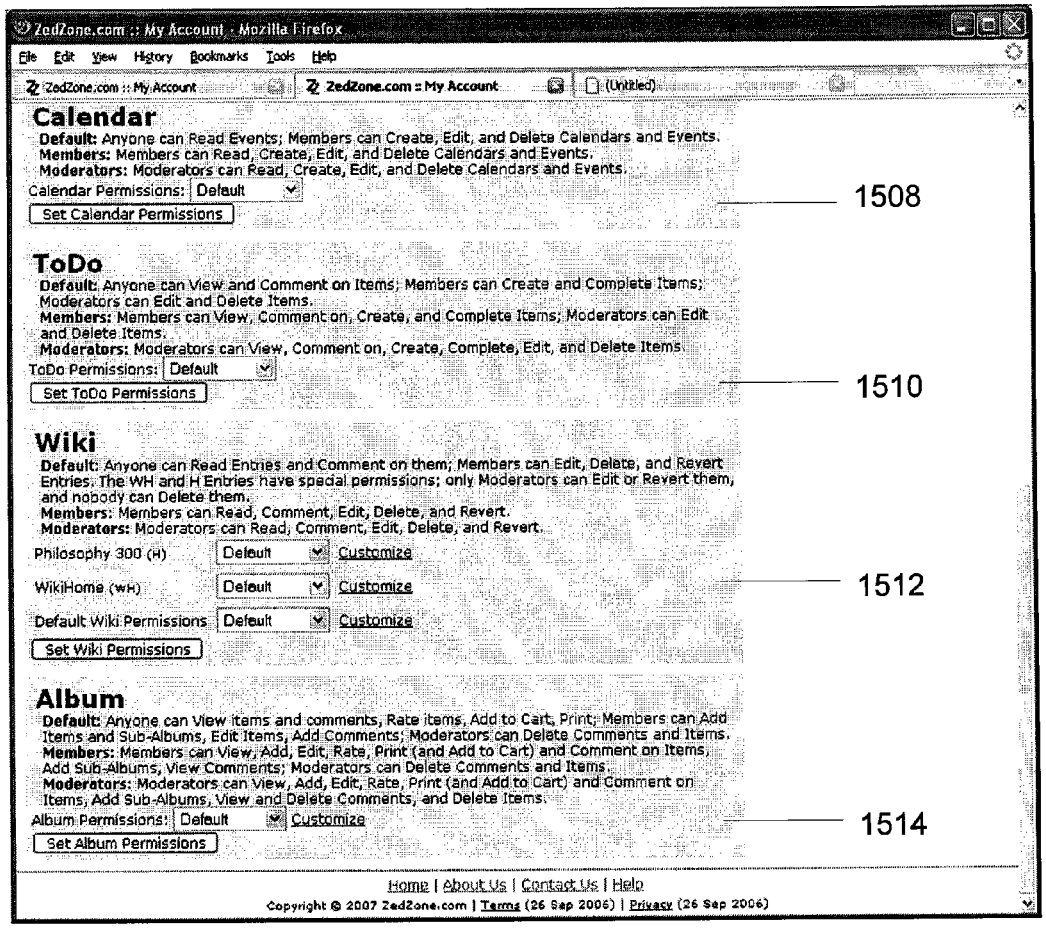
FIG. 15B: MANAGE COMMZONE PRIVACY
2/2

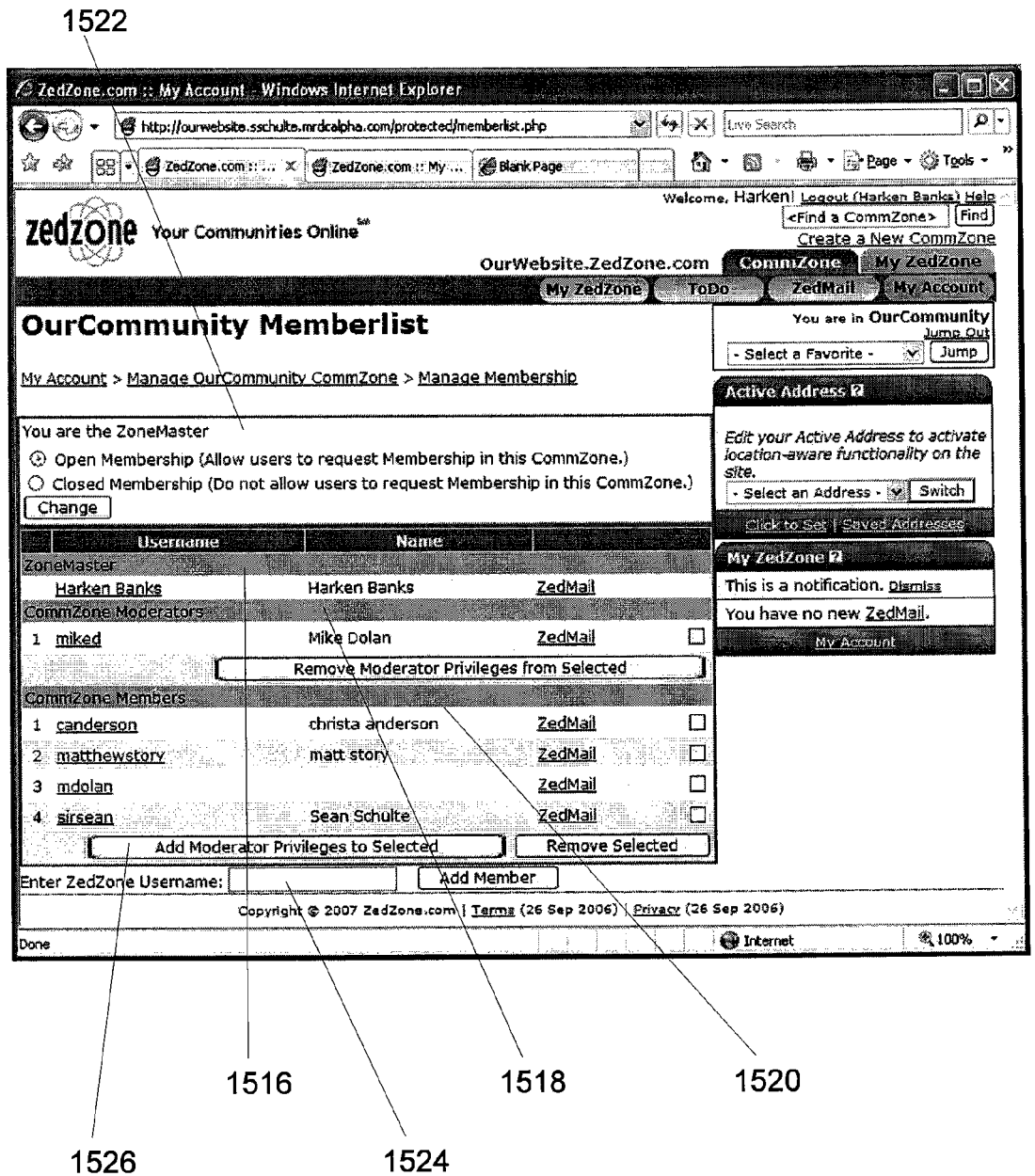
FIG. 15C: MANAGE COMMZONE MEMBERSHIP

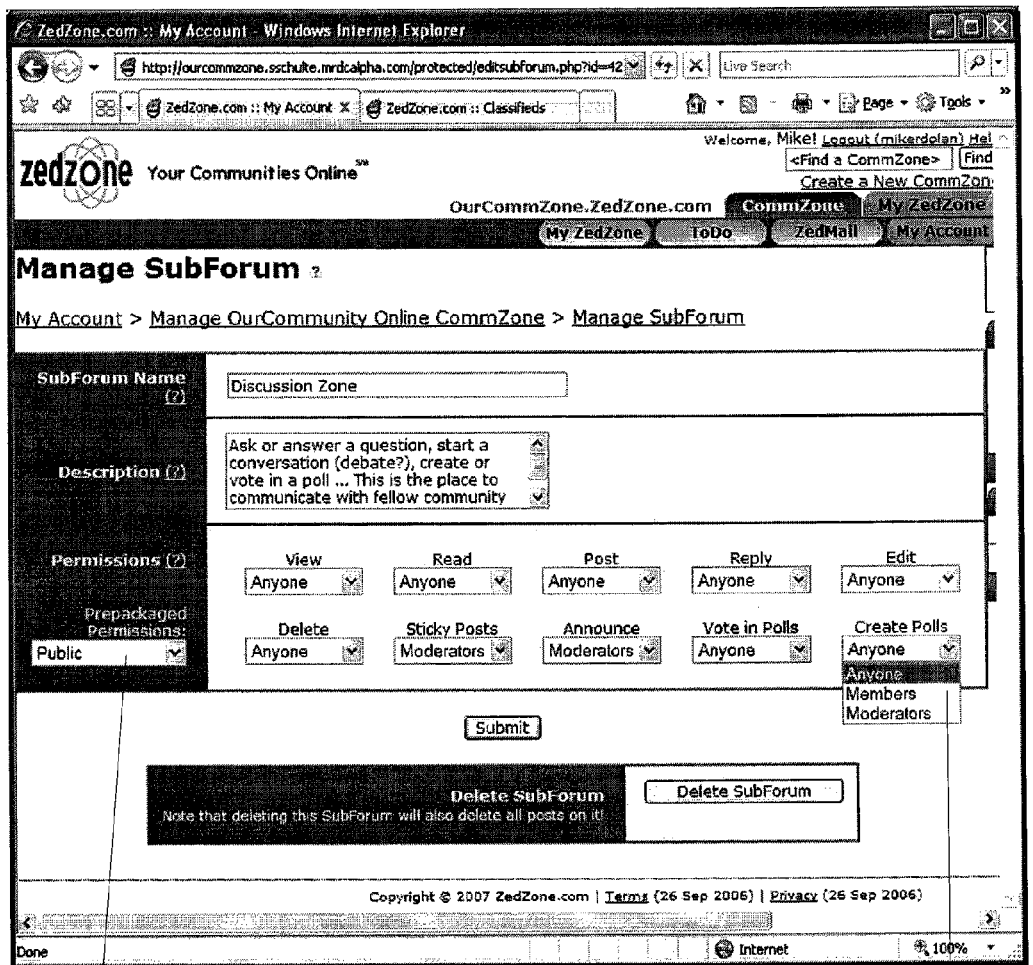
FIG. 15D: MANAGE SUBFORUM

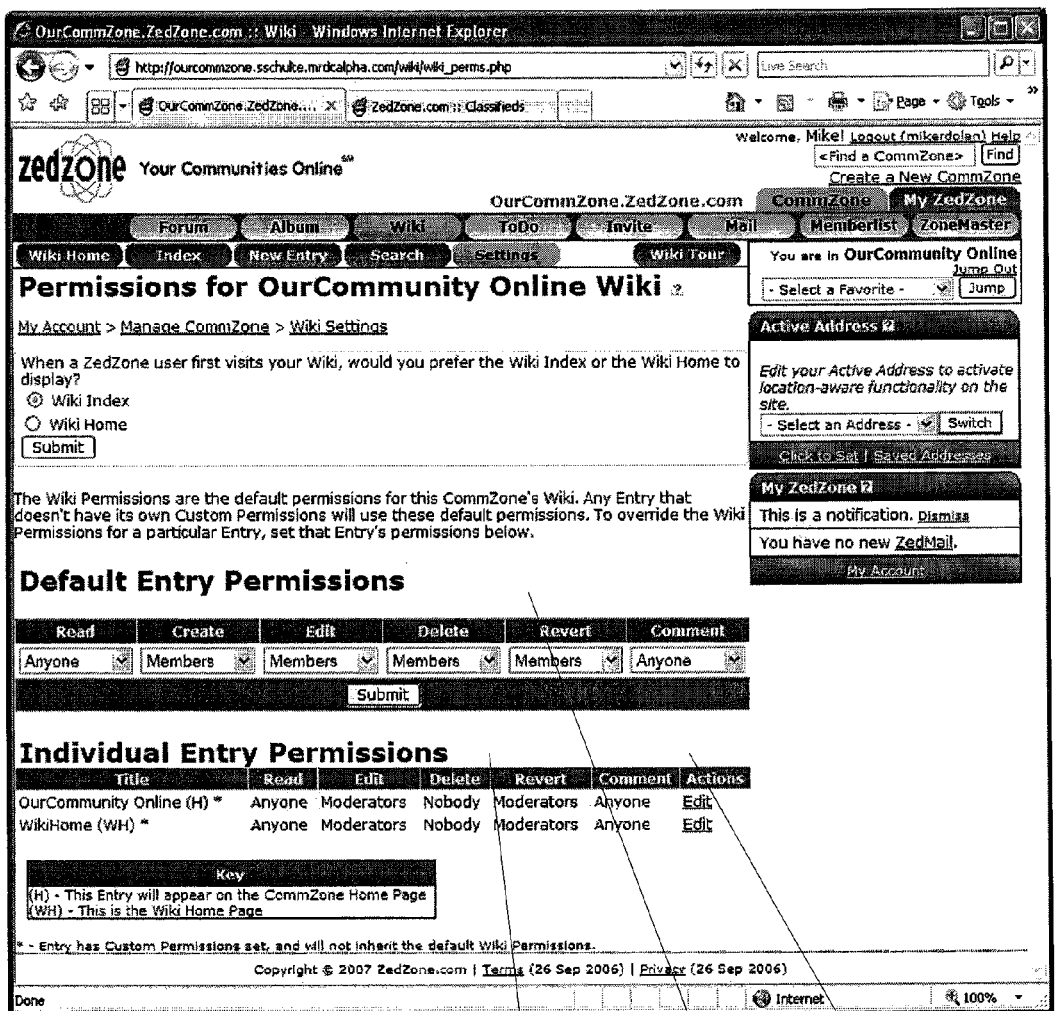
FIG. 15E: WIKI PERMISSIONS

FIG. 15F: ALBUM PERMISSIONS 1/2

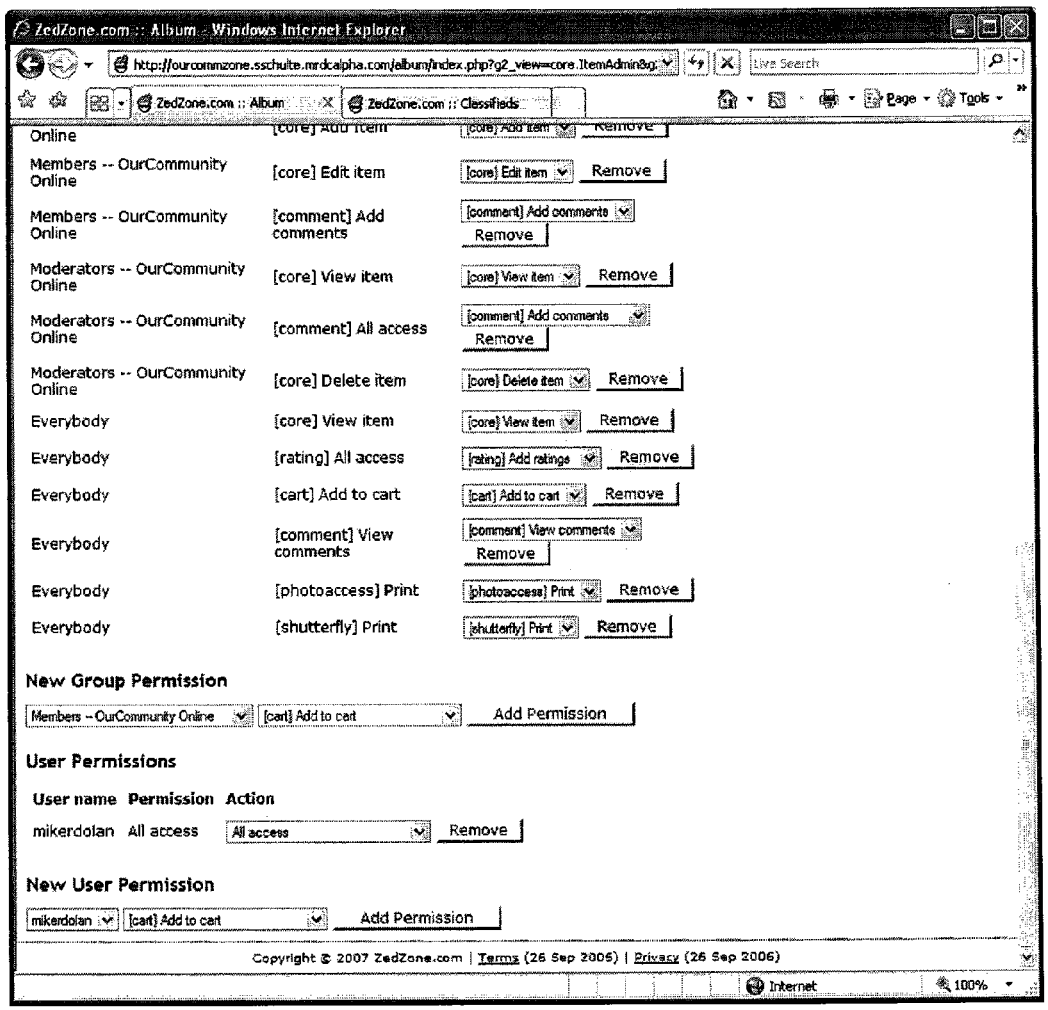
FIG. 15G: ALBUM PERMISSIONS 2/2

FIG. 16: MY ZEDZONE HOME

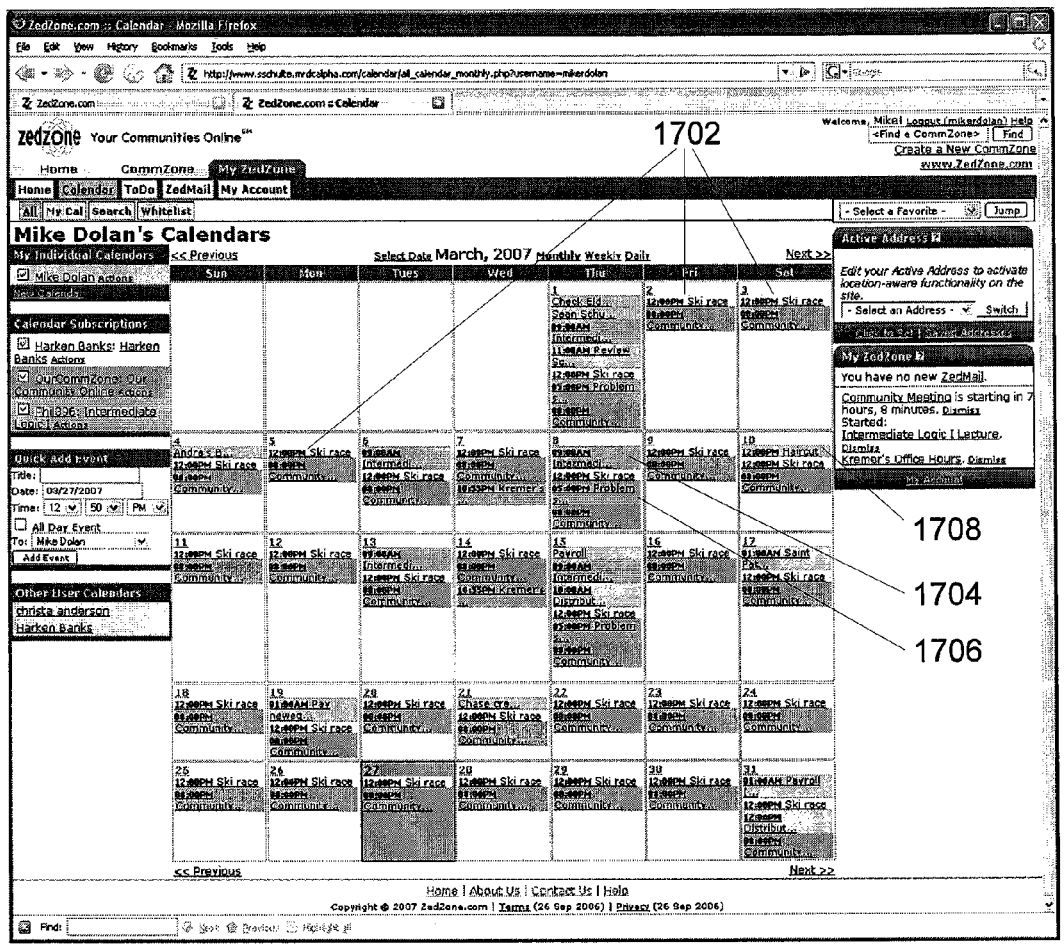
FIG. 17: ALL VIEW OF A MY ZEDZONE CALENDAR

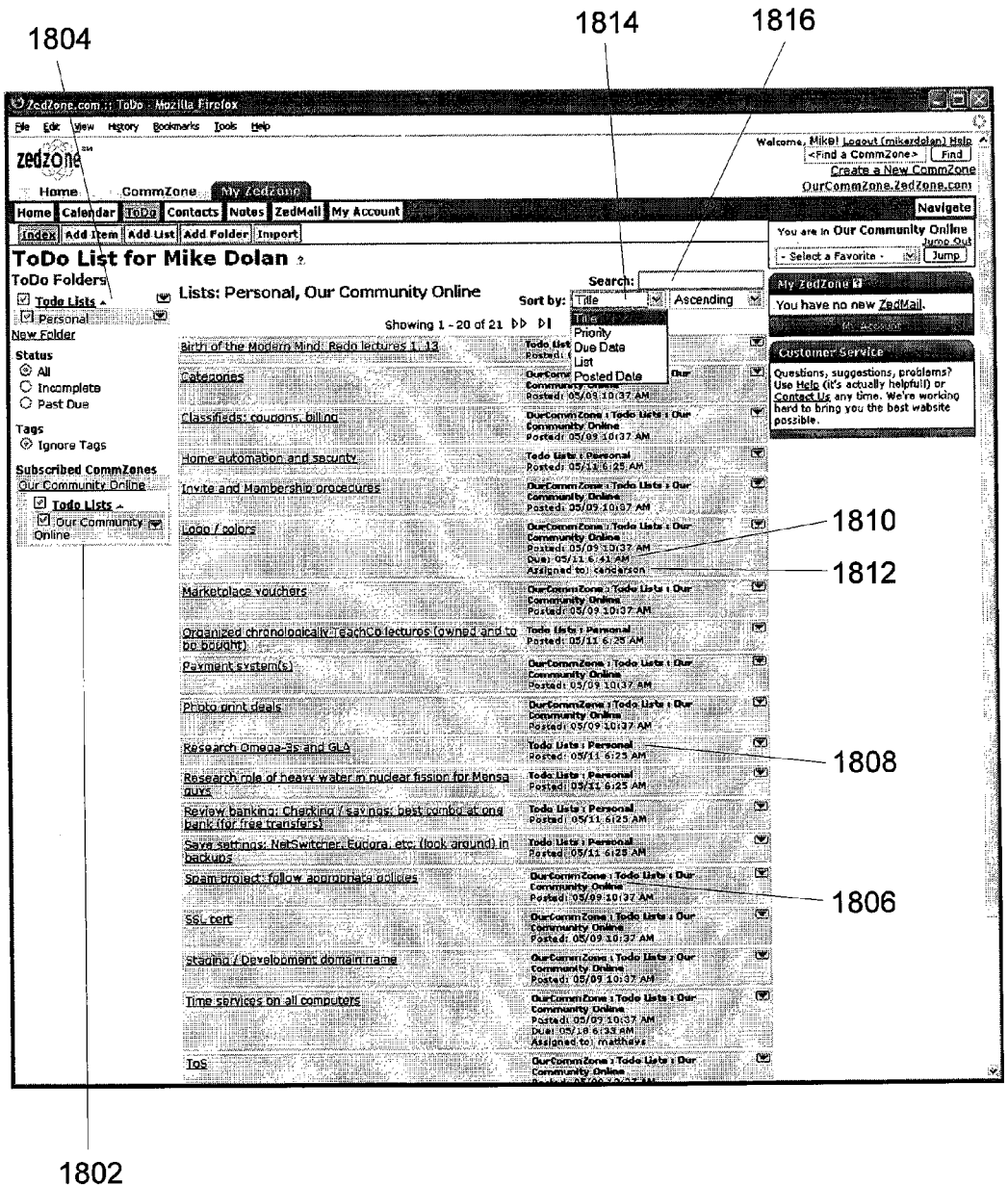
FIG. 18: MY ZEDZONE TODO

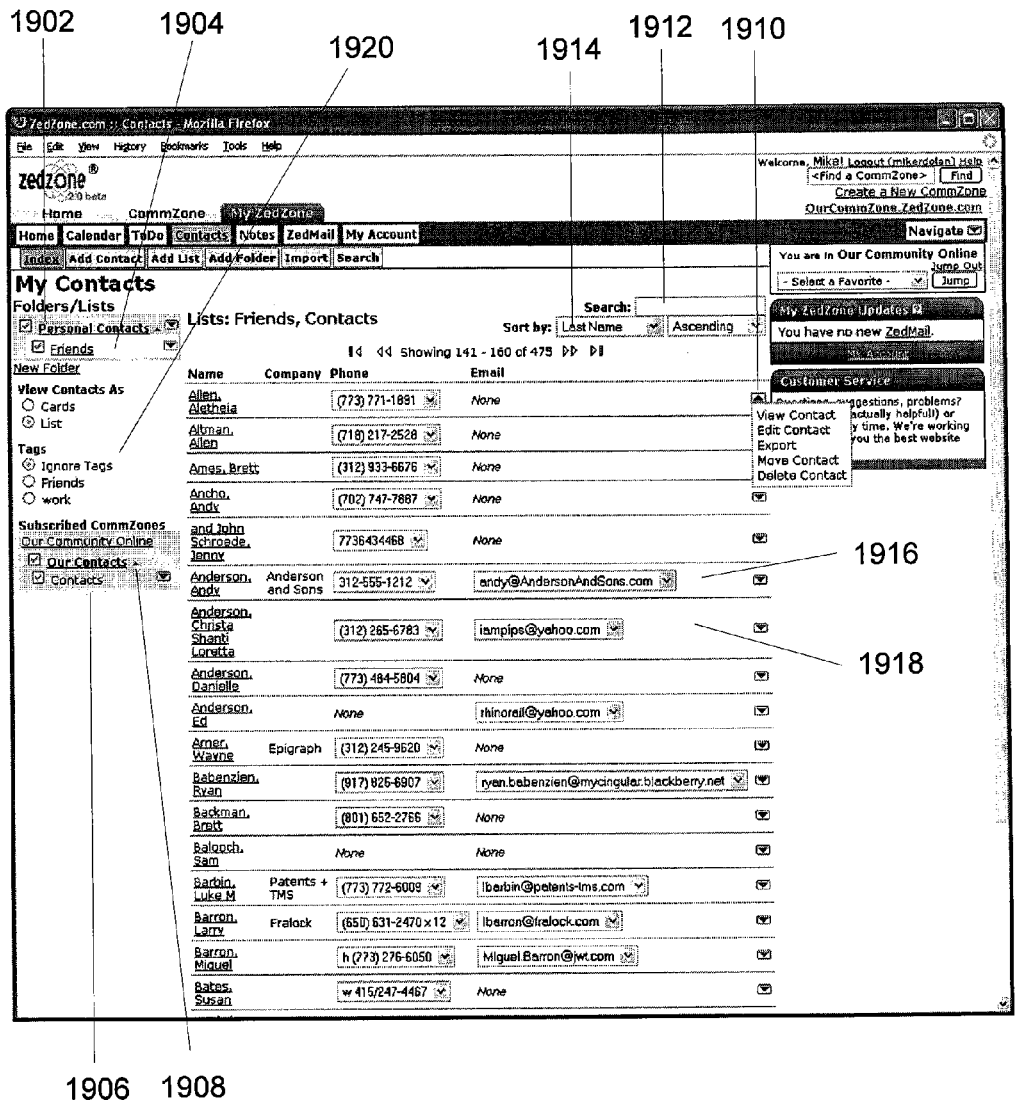
FIG. 19: MY ZEDZONE CONTACTS

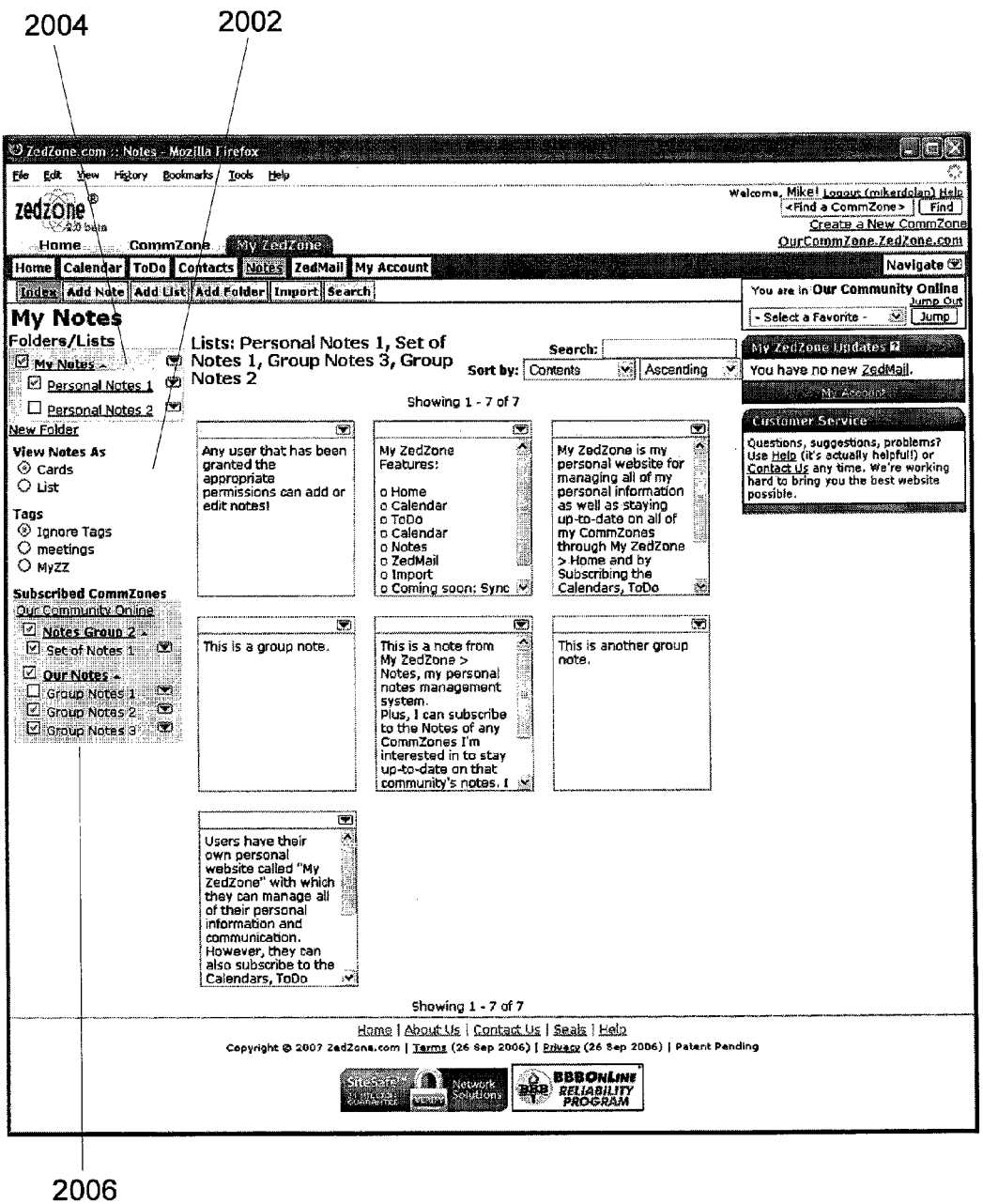
FIG. 20: MY ZEDZONE NOTES

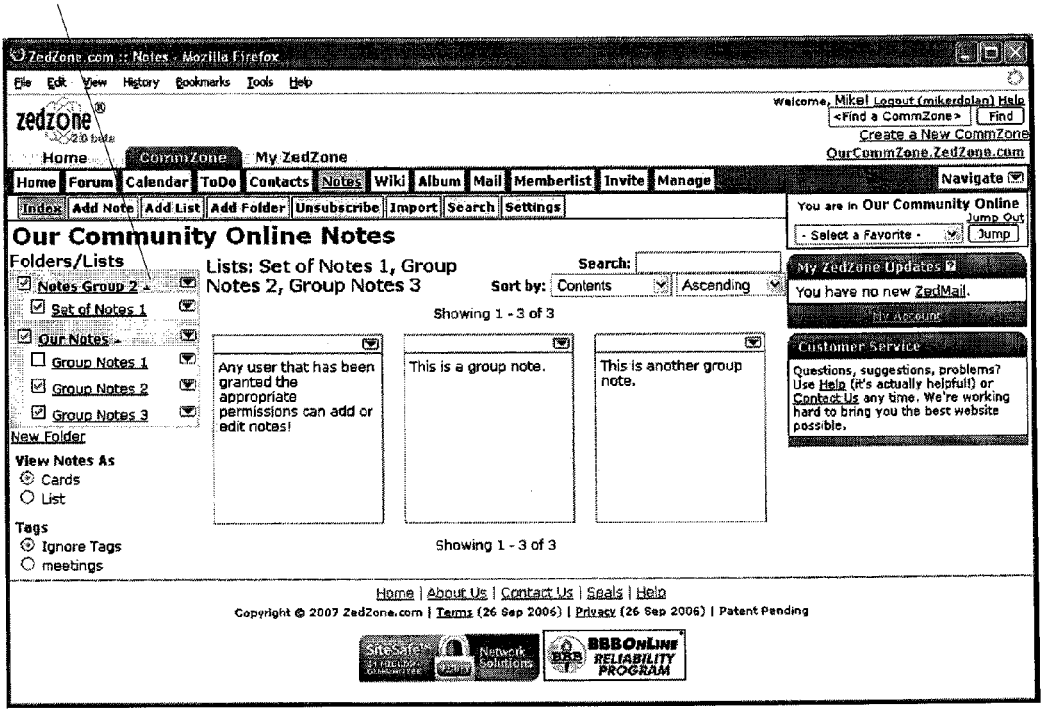
FIG. 21: COMMZONE NOTES

SYSTEM AND METHOD OF USER DEFINITION OF AND PARTICIPATION IN COMMUNITIES AND MANAGEMENT OF INDIVIDUAL AND COMMUNITY INFORMATION AND COMMUNICATION

CROSS-REFERENCES TO RELATED APPLICATIONS

This application claims the benefit of U.S. Provisional Application No. 60/908,491, filed Mar. 28, 2007.

BACKGROUND OF THE INVENTION

The present invention generally relates to the field of electronic computer systems. The invention includes a set of systems and methods that improve the means by which its users can define and participate in communities and by which users can manage their individual information and communication as well as that of their communities.

A community is a group based on some combination of location, interest, similarity, or identification with the group. Generally, every person belongs to a variety of communities and participates in them in a variety of capacities and/or ways. Fundamental to both the individual and the community is communication and information. There is therefore a need for a system that supports its users in defining and participating in their communities and managing their individual and community information and communication.

The various sorts of communities that exist can be broken down (at least roughly) into four types: (1) communities defined primarily by geography or geopolitical boundaries; (2) communities defined primarily by some combination of interest, similarity, or identity shared by its members; (3) online communities created by users linking to other users who they designate as friends; and (4) online communities that are pre-defined for users based on real-world communities. Each of these types of communities is described further below.

Communities of type (1) are defined primarily by geographical or geopolitical location or area. For example, a person—just by virtue of where she lives, works, etc.—is typically part of a neighborhood, city or town, county, state, and/or country, as well as the global community. Much of a person's life might (and typically does) involve things that are local. But, even if a person has a sense of what he generally considers his local community, what is appropriately "local" for him might vary, even frequently and significantly, depending on his circumstances and what he desires to accomplish at any given time. For example, a person might want to locate a product or service that is available within a certain distance (or driving time or driving distance, for example) of her home. Or, she might want to find the closest such product or service to her office. Someone might want to find a job that is very close to home or may be willing to commute quite some distance. An individual might want to move locally and stay within a tightly-specified area, or she might be interested in moving quite some distance. She might want to move to a locale that is far away from where she currently lives. In each case, what the individual considers the appropriate "local" area can vary significantly and/or frequently according to, for example, his current circumstances and/or purposes. The area could be nearby or far away; it could be a very small area up to the whole world. There is a need therefore for a system with which the user can define for himself a geographically-based community and then participate in the community through the use of a system that provides commerce, communication, information, etc. for that community. In today's information-based world, this system can be computerized.

Communities of type (2) are defined primarily by some combination of interest, similarity, and/or identity. Geography may be a factor in defining communities of this type, but is secondary to the other factors. Examples of communities of type (2) in which geography plays a role in defining the community include companies, schools or school-related organizations, teams, clubs, people participating in an event, families or groups of friends, local business organizations, etc. Examples of communities of type (2) in which geography plays no role or a very limited role in defining the community include groups based on a common interest (for example, in board games, collecting stamps, dog training, etc.), that sharing of one or more characteristics (for example, being tall, being short, being Christian, etc.), or identification with a group (for example, being a fan of a sports team, being an alumnus of a college, etc.). Regardless of the degree to which geography plays a role in this second type of community, it is some combination of other factors (interest, similarity, and/or identity) that is most important in defining the group. Communities of this second type are typically different for each individual since each individual's interests, characteristics, and/or feelings of identity with certain groups tend to be a subjective matter. There is a need for a system and method that allows a person to define for themselves communities of this sort. There are websites that support particular communities, but they are devoted to a particular community that is pre-defined for the user and lacks the flexibility appropriate to this type of community. Thus, there is again a further need to participate in this community through a (computerized) system that is flexible enough to enable the user to conveniently organize personal choice or participation information and to do so in an unique community the user defines.

Communities of type (3) have emerged on websites. These types of communities are created by users of a system which allows them to network with other users. One way such user networks can be established is through interconnection of users who designate one another to be "friends." In such a case, each user can designate one or more other users of a system to be his or her friends. In this way, a user network emerges from the individual-to-individual connections that are made. Although the connections made in this type of community are fundamentally between one user and another user, there is much group interaction that can occur via the present invention among all or a subset of members of user networks that emerge from such one-to-one interconnections. Accordingly, there is a need in these participation and often computerized-based communities for a system which organizes and facilitates convenient interaction between users. A further need is for these communities to interact with other of the user's communities.

Communities of type (4) are pre-defined for the user on the basis of existing, real-world communities to which the user belongs. Examples of such communities are all or parts of companies, schools, other organizations, etc. If, for example, a user is an employee of a company, she may be allowed to join into various pre-defined online communities for that company. Again, in today's information based world, people typically require an organizational approach which helps them to run the daily, more routine aspects of their lives. A large growing number of people rely on computers sometimes in the form of PDA's, for this organizational framework. In view of limitations inherent in current approaches including an inability to both communicate and integrate with other community types, there is a need for a system that facilitates the organization and integration of our daily routines with other aspects of our lives.

Moreover, there is a need for a system and method by which the user can define for himself exactly what his communities are and participate in them as he chooses. Similarly, there is a need for an ability to communicate, collaborate, share data and information, etc. which is up-to-date at all times and is accessible from anywhere (which presently means via a personal computer, mobile device, etc.).

Of course, communities don't always fall neatly into one of the categories defined here and the ways in which users might use the invention might vary greatly. It should be borne in mind that communities might not fall exactly into any of the categories above, can fall into a combination of those categories, and that it is an aspect of the current invention that it is up to the user to decide how to use the invention as a platform that supports his activities.

Another thing that should be borne in mind about communities in general is a community might be part of one or more larger communities (for example, a school might be part of a larger school system), might include in it all or parts of one or more smaller communities (for example, a company might have various departments, offices, regions, etc.; a school has various classes, clubs, teams, event-planning groups, etc.), and might overlap with other communities in all sorts of different ways.

Therefore, there is a need for a flexible and interactive system that facilitates the integration of our unique and evolving community-based lives. The present invention satisfies these and other needs.

SUMMARY OF THE INVENTION

Briefly and in general terms, the present invention is directed toward providing a set of systems and methods that support the activities of its users in defining their communities for themselves and participating in those communities. In one aspect, the present invention is embodied in a computerized system. In one particular aspect, the system of the present invention is accessible via a single user interface.

In one embodiment, the system of the present invention contemplates up to four or more types of integrated communities. These communities can include one or more of a local website, a community website, an individual private website, and an individual public website. These communities are designed to be integrated and to include supporting functionality (for example, specification of location, specification of geographical area).

In further aspects of the present invention, the user is able to define and participate in his communities via the creation and/or use of the various contemplated communities. The system of communities can further integrate various calendars and ToDo lists as well as a specification of location and/or geographical area. Moreover, the system can be configured to provide the user with an ability to set separate and distinct permissions for each of the various communities as well as for the use of a user-specified subdomain in the creation and access of one or more communities.

Further, in still yet further aspects of the invention, there is contemplated various combination of functionality of the contemplated components of the system. In particular, a selected number of the functions of a forum, an album, a Wiki, and mail as well as the calendar and ToDo functions can be combined to define attributes of the community-base system of the present invention. These functions and the contemplated groups or sub-groups of communities are integrated to define a flexible and interactive system which is desirable to the user.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 8 is a screen shot that illustrates the combination of community website, local website, individual private website, and specification of location in a single user interface in an embodiment of the invention.

FIG. 9 is a screen shot that illustrates find community websites in an embodiment of the invention.

FIG. 10 is a screenshot that illustrates create community website in an embodiment of the invention.

FIGS. 11A-F are screenshots that illustrate an implementation of specification of location.

FIGS. 12A-G are screenshots that illustrate specification of location and/or specification of geographical area used in conjunction with find community websites and the marketplace and classifieds functions of the local website in an embodiment of the invention.

FIG. 13 is a screenshot that provides an example of the integration that occurs among parts and/or functions of an embodiment of the invention in an embodiment of the invention.

FIG. 14 is a screenshot that illustrates a community home page of a sample community website 500 in an embodiment of the invention.

FIGS. 15A-F are screenshots that illustrate the use of the visibility setting, user groups, and permissions in a community website in an embodiment of the invention.

FIG. 16 is a screenshot of an individual private home page in an individual private website in an embodiment of the invention.

FIG. 17 is a screen shot of the "All" view of an individual private calendars 604 section of an individual private website in an embodiment of the invention.

DETAILED DESCRIPTION OF THE PREFERRED EMBODIMENTS

With reference now to the figures which are provided by way of example and not limitation, examples of how one might build and use the embodiment are presented. The various contemplated embodiments can be implemented in a wide number of ways. The use of examples is thus intended to be illustrative only and should not be construed as implying that the embodiment, much less the invention, requires or is limited to any particular types or numbers of systems, computers, computer networks, technologies, users, or communities.

Further, although the embodiment is described as including a number of functions, aspects of the embodiment do not require all of these functions. Rather, it should be borne in mind that there are many aspects of the embodiment that are formed using only one or a small subset of all the functions described.

In addition, the discussion of the embodiment is in the context of a website which represents one way the system could be implemented. However, the system could be implemented using different technologies and still provides its users with the same or similar functionality.

Figure 1:
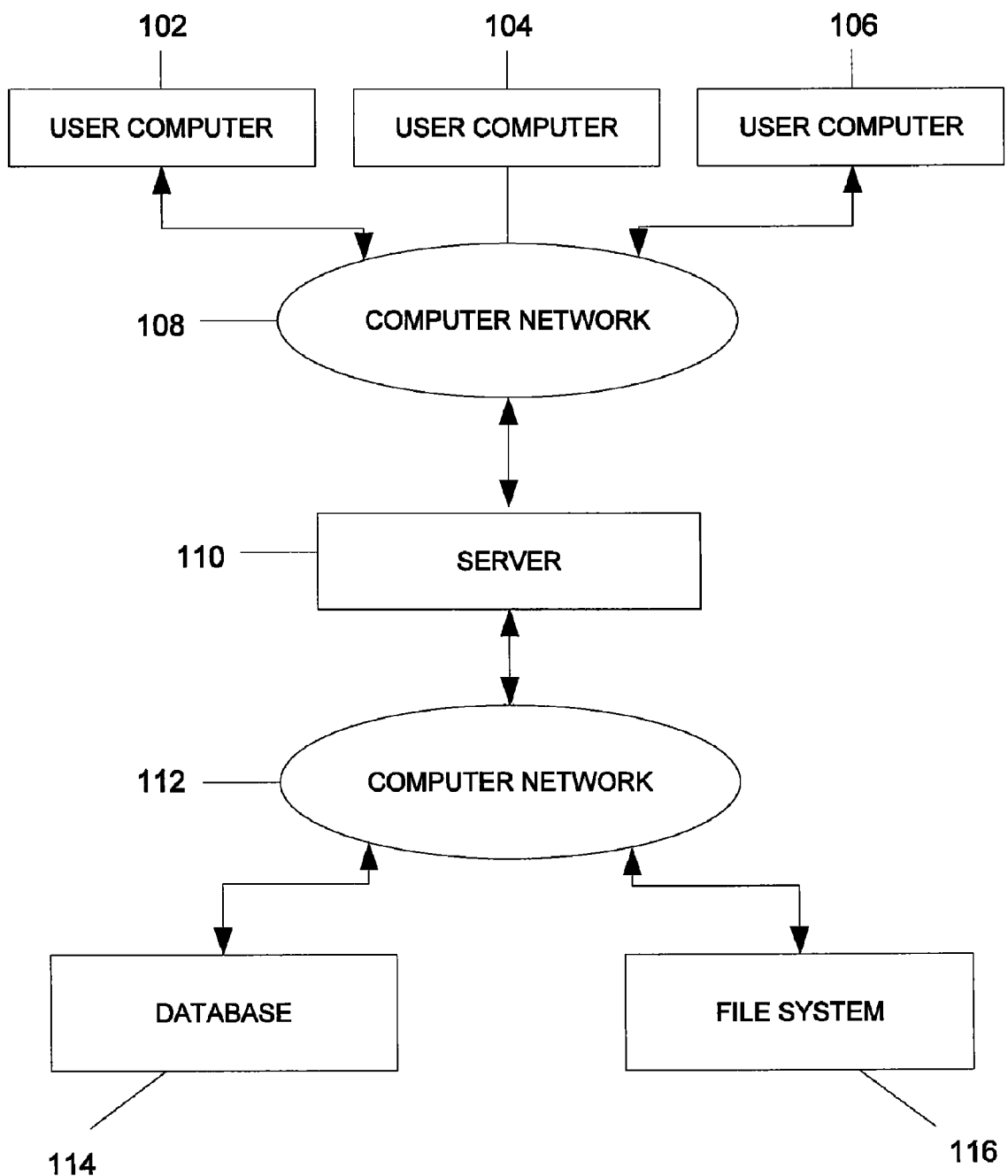
FIG. 1 is a diagram that illustrates a networked computer system in an embodiment of the invention.

With reference to FIG. 1, a diagram of the functional structure of a system of computer systems in the embodiment is shown. User computers 102-106 represent the computers of users of the system of the present invention. There can be any number of such computers. These could be any type of device that would allow the user to connect to server 110 via computer network 108, send and receive data to and from server 110, and process that data appropriately. For example, if server 110 is a web server, computer 102 could be personal computer or mobile device running a web browser. User computers 102-106, then, represent all possible systems that users might use to communicate with server 110.

Computer network 108 represents any system of one or more networks and/or computer systems that connects the user computers to server 110. This network could be of any type that performs this function. It could, for example, be the Internet, an intranet, a local area network (LAN), a wide area network (WAN), or any combination of one or more such networks or other types of networks. For example, if computer network 108 includes the Internet, user computer 104 might be connected to the Internet via a wireless and/or wired LAN. Computer network 108, then, represents all possible combinations of networks that users of user computers 102-106 might use to connect to server 110.

Server 110 represents any system of one or more computer systems that communicates with user computers 102-106 via computer network 108. Server 110 could, for example, be a set of one or more web servers. In addition to communicating with user computers 102-106, server 110 also sends and receives data to and from database 114 and file system 116 using computer network 112. Server 110 then represents any possible system of one or more computer systems that might work in conjunction with user computers 102-106, computer network 108, computer network 112, database 114, file system 116, and any other systems that might be used to implement the embodiment.

Computer network 112 represents any system of one or more networks that connect server 110 with database 114 and file system 116. Computer network 112 could be any set of one or more networks and/or computer systems that allow for communication between server 110 and database 114 and/or file system 116. For example, computer network 112 could be any combination of the Internet, a LAN, or a WAN. It might, for example, be a private network dedicated to data moving between servers where server 110, database 114, and file system 116 are considered servers.

Database 114 represents any system of one or more computer systems running or containing one or more databases. Any system that can store and make available the data needed for the embodiment might be used.

File system 116 represents any system of one or more computer systems that enable the storage and/or retrieval of files. Any system that can store and make available files as needed for the embodiment might be used.

FIG. 1 is meant merely to be illustrative of the sort of functional structure which one contemplated embodiment of the present invention may possess. As is the case with all systems discussed in this application, any number of computer systems can be connected to computer networks 108 and 112, which themselves can be comprised of any number of networks and/or computer systems, and the invention should not be construed as requiring or being limited to any particular number of computers, networks, or other devices. For example, server 110, database 114, and file system 116 could all run on a single system, eliminating the need for computer network 112; server 110 could be a single web server, vast array of web servers, or a system of clustered servers that function as one web server; database 114 and file system 116 could be a single system; database 114 or file system 116 could be one computer system or a large cluster of networked computers. There is a wide range of possibilities for implementing the functional structure.

Any of the computer systems of FIG. 1 might be run on a wide variety of operating systems, including but not limited to one or more of the many flavors or versions of Linux, Unix, or Microsoft Windows, an operating system for a portable device, or some other operating system or other system performing the necessary functions (including a system that has not yet been conceived).

Consider as an example the case in which the embodiment is implemented as a website. If server 110 is a web server, the function of web serving might be facilitated by any one or more web servers, including but not limited to any one or more flavors or versions of Apache or Microsoft's Internet Information Server (IIS). The function of web browsing, performed on behalf of the users of the system and represented in user computers 102-106, could be handled by any one or more flavors or versions of any one or more web browsers, including but not limited to Mozilla, Firefox, Safari, Microsoft's Internet Explorer (IE), Opera, Cimino, Konqueror, Links, Epiphany, Galeon, another web browser, a web browser or other system that allows for communication with server 110 via a mobile device, or any other system that allows for the necessary communication with server 110 and necessary handling of data.

The software specific to the invention could be implemented using a wide variety of technologies, including but not limited to any combination of one or more of the following languages, standards, specifications, protocols, frameworks, libraries, pieces of software, etc.: PHP, Perl, Python, Javascript, JSON (Javascript Object Notation), XML, XML Schema, HTML, XHTML, Ruby, DHTML (Dynamic HTML), SQL, PLSQL (Procedural language SQL, such PLmySQL or PLpgSQL), AJAX, QT, ASP, ASP.net, ColdFusion, Flash.

Figure 2:
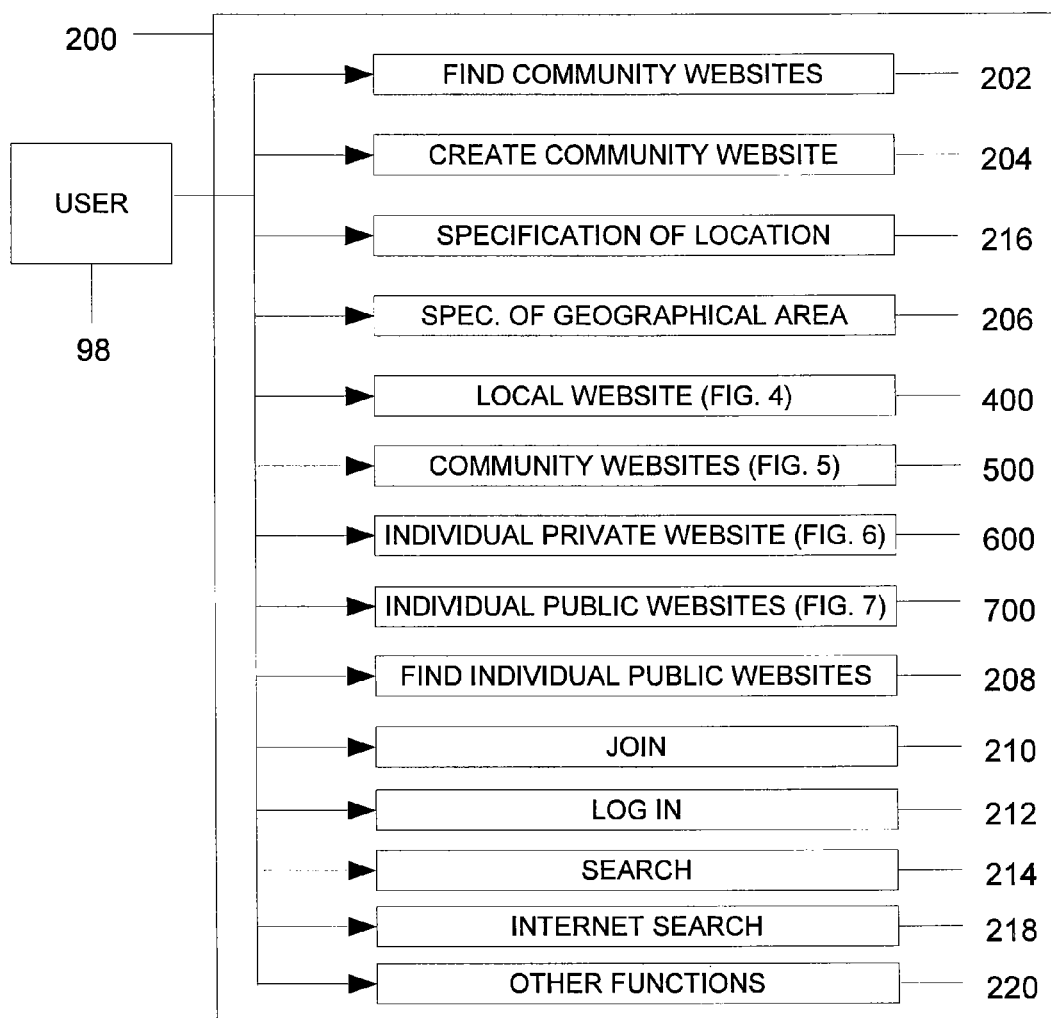
FIG. 2 is a diagram that illustrates certain of the main parts of the invention in an embodiment of the invention.

Turning now to FIG. 2, an overview of main parts of the embodiment is illustrated. It is to be noted that some of these parts are illustrated in more detail in subsequent figures. User 98 represents any user of the system and method of user definition of and participation in communities and management of individual and community information and communication in an embodiment 200. There can be any number of such users. Find community websites 202 allows users to search for and access community websites 500.

Create community website 204 allows users to create a community website 500. The user fills out a brief form containing the necessary fields of data and a community website 500 is immediately created. Part of this process determines a uniform (or universal) resource locator (URL), that is a unique address for the community website 500. The URL might be determined, for example, by appending a computer-generated or user-specified set of characters to a certain URL (e.g., http://www.zedzone.com/OurSite, where "OurSite" uniquely identifies the Community Website from all other websites on the overall website). Alternatively, the URL for a Community Website might be a subdomain specified by the user or generated by the system (e.g., http://OurSite.zedzone.com/ where OurSite is the subdomain). The use of user-specified subdomains in the URL for a community website 500 is an aspect of the embodiment. However, as long as some unique address for the community website 500 is determined, create community website 500 will work in concert with the rest of the embodiment.

Specification of location 216 allows the user to specify where he is located, which, as an aspect of the embodiment, can enhance the use of a variety of functions of the embodiment.

Specification of geographical area 206 represents a system by which the user can specify the geographical area under consideration for his purposes at the time he is using the system and/or particular functions of the system. If the user specifies a geographical area, the content and/or functionality of the system can be modified or extended to reflect that area. (Specification of geographical area 206 is discussed further below in conjunction with a discussion of specification of location 216 and FIG. 3.)

Moreover, local website 400 is a set of content and functionality that can be tailored according to a user's specification of location 216 and/or specification of geographical area 206. Community websites 500 is a set of websites, each of which provides a set of content and functionality oriented toward a community. Additionally, individual private website 600 is a set of content and functionality provided to each user of the system that is oriented toward that individual user and toward integrating functionality and content from various parts of the embodiment on behalf of that user.

Individual public websites 700 is set of websites, each of which provides a set of functionality and content oriented toward interaction between and among users of the embodiment. Each user can have such a set of functionality and may be able to access the individual public website 700 of one or more other users. Find individual public websites 208 is a search and/or browse facility that helps users locate individual public websites 700. Join 210 allows the user to create an account, thereby becoming a member of the system. Log in 212 allows to user to log in to the system under an account created via join 210. There is a corresponding log out function. Other functions 220 is to be illustrative of that the embodiment can include additional functionality.

Search 214 is search function which allows the user to search the content of the embodiment.

Internet search 218 is an Internet search function, which, in addition to providing functionality for searching the content of the Internet might also provide integration with various functions of the embodiment. For example, results of searches can reflect (instead of or in addition to content from around the Internet) the content and/or functionality of any combination of one more of find community websites 202, local website 400, community websites 500, individual private website 600, and/or individual public website 700. For example, in terms of the content of local website 400, results could include items in marketplace 404, classifieds 406, directory 408, local calendars 410, housing 414, real estate 416, etc. Similarly, for example, results could reflect metadata about or content and/or functionality drawn from the set of community websites 500 or some subset thereof. So, Internet search 218 can combine search results based on the content of the Internet outside of the embodiment as well as content and/or functionality from within the embodiment. One approach to Internet search 218 would be to provide results from the content of an embodiment, thereby supporting Internet search 218 (or helping to support it) financially through revenue gained from using other parts of the embodiment. This approach might allow for the elimination or reduction of paid advertisements and open up the possibility for providing users with search results superior to those of existing systems that are heavily dependent of advertisements or paid-keyword-based searching.

Aspects of the presently contemplated system are the combination of and/or integration between or among different parts, functions, and/or features of the embodiment. Such combinations and integrations occur between and among a variety of different pieces of the system including, for example, between and/or among one or more (a) parts illustrated in FIG. 2, (b) functions within each of these parts, (c) functions within different parts, (d) one or more functions in one part and one or more functions in one or more other parts.

That pieces of the embodiment are referred to as "parts", "functions", "features", etc. should not be taken to imply that they are to be used or are presented to the user in isolation from one another. On the contrary, the parts of the embodiment work together to form a synergistic system in a variety of ways. Such combinations, synergies, and/or integrations between and/or among parts are aspects of the embodiment.

Any combination of one or more of the following concepts in a single system or user interface can define an aspect of one embodiment of the invention: local website 400, community websites 500, individual private website 600, individual public websites 700. For example, the following combinations can be desirable aspects of the embodiment: (a) local website 400 and community websites 500; (b) community websites 500 and individual private website 600; (c) local website 400, community websites 500, and individual private website 600; (d) local website 400, community websites 500, individual private website 600, and individual public websites 700; (e) local website 400, community websites 500, and individual public website 700; (f) individual private websites 600 and individual public website 700; (g) local website 400 and individual private website 600; (h) local website 400 and individual public websites 700; etc.

Another example of the integration between and/or among the parts of the present invention illustrated at the high level of FIG. 2 is that once the user has used specification of location 216 and/or specification of geographical area 206, she can

- Receive customized output from the functions of the local website 400. For example, the user can restrict search results for any one or more functions of the local website 400 to the area under consideration, or order search results by distance (or driving distance or driving time, etc.).
- Use find community websites 202 to search for community websites 500 that are near a specified location and/or in the specified geographical area;
- Use find individual public websites 208 to search for other users that are nearby and/or in the specified geographical area.
- Take advantage of other features of the site—for example, in her individual private website 600 or individual public websites 700—that can use geographical information.

One synergistic aspect of the embodiment is that the user has as much as four or more ways in which to define his communities and participate in them, namely:

1. Specifying a location and/or specifying a geographical area and then using the local website 400 or other functions of the embodiment which can take advantage of such location or geographical information. Note that specification of location 216 and specification of geographical area 206 are optional for the user, and when no geographical boundary is specified, the local website 400 and other functions are effectively global.

2. Creating and/or using one or more community websites 500.

3. Creating and/or using user networks via individual public websites 700. (Such networks can be established among users who designate one another as friends. Such networks might be established among one or more strict subsets of that network of friends.)

4. Using pre-established user networks for particular communities, for example, for all or parts of schools, companies, or other organizations. In such a case, appropriate users could join such a network and participate in its community through (1) the individual public websites 700 of some or all of the members of the user network, (2) community websites 500 that support the community, and/or (3) functions of the local website 400 where content therein is restricted to members of one or more user networks or subsets of those members as specified by the user.

A further aspect of one embodiment of the inventor is the user's ability to define and participate in communities through any combination one of one or more of 1, 2, 3 and/or 4. For example, the combinations of 1 and 2; 1 and 3; 2 and 3; 1, 2, and 3; 1, 2, 3, and 4; 1, 2, and 4; 2, 3, and 4; 1, 3, and 4 are aspects of the embodiment.

In using various parts of the system of the present invention, it has been recognized that it is useful to the user that he specify his location. The user may wish to specify or re-specify his location at any time depending on what he wishes to accomplish.

The user's specification of his location might be accomplished in a number of ways. For example, the user might fill out a form on a web page which contains one or more address-related fields, the content of which is analyzed by the system in an attempt to determine as accurately as feasible the user's location. This also might be accomplished in a variety of ways, including but not limited to the following: through a form containing a single address or location field; through a form containing select address-related fields (for example, a city, a zip code, a state, or some combination of these); or in a form containing all address fields (for example, street address, city, state, zip or postal code, country) which the user might fill out partially or entirely. Alternatively, the user might specify his location by specifying his geocode directly or by using a system (for example, user computer 102 of FIG. 1) that can determine his location and send location data to server 110 of FIG. 1. These are some examples of the variety of possible ways in which the user might specify his location. Given such input from the user, the system may be able to determine the position of the user with accuracy adequate for the purposes of the user.

Figure 3:
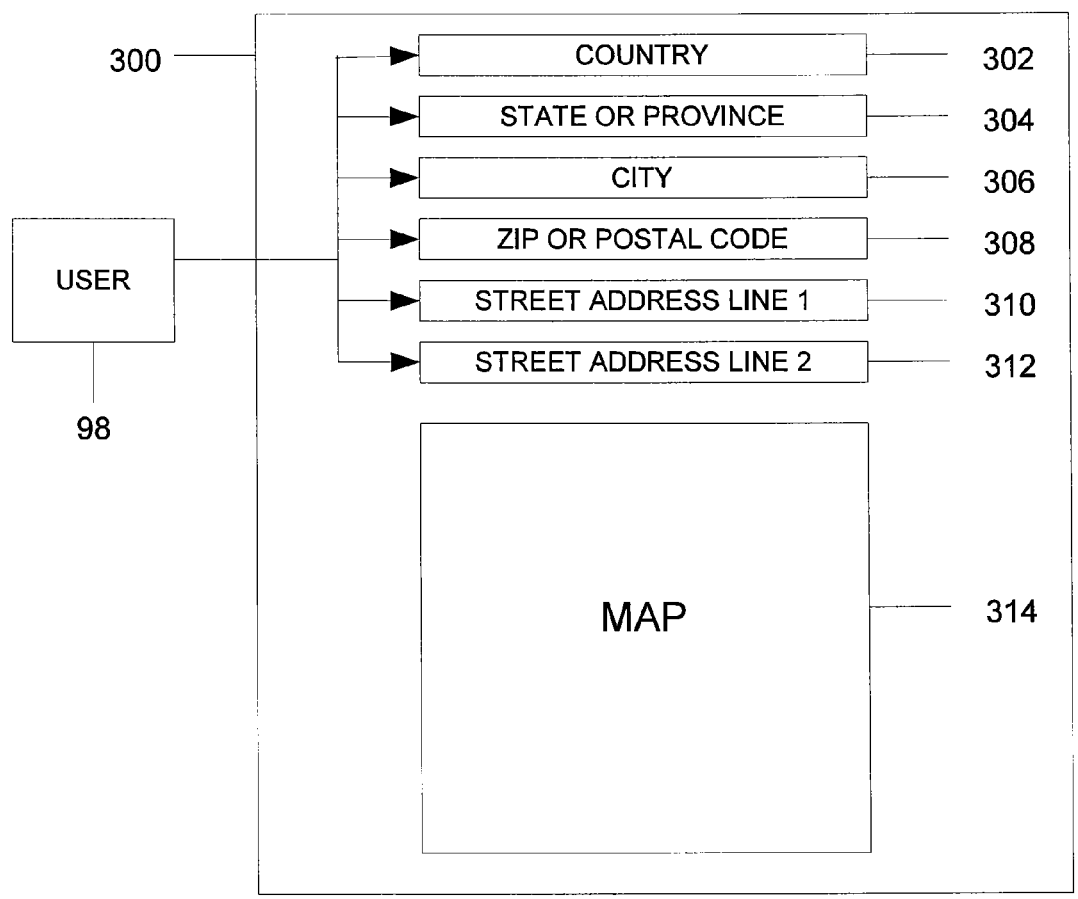
FIG. 3 is a diagram that illustrates one particular example implementation of specification of location in an embodiment of the invention.

FIG. 3 represents one very particular implementation of specification of location 216 of the present invention. The method here is to present the user with the following fields in the following order: country 302, state or province 304, city 306 (or town or other municipality), zip or postal code 308, street address line 1 (310), street address line 2 (312). (Exactly which fields are presented to the user and the order thereof might vary (for example, because there are various ways of capturing address and/or location data, and/or because the formats of addresses vary around the world).) Whenever the user updates one of the fields, map 314 is updated to reflect the position of the user as best as the system can determine it given the input the user has specified.

What typically occurs in a user interaction with the particular implementation of specification of location 300 is that, the user first specifies a country, at which time the map is updated, showing a "map pin" that points to a central point in that country. Next, the user specifies his state or province and the map is then further updated, zooming in on the state or province (at least roughly; as best as the system is able) and positioning the map pin at a central location for that state or province. Next the user specifies his city (or town) and the map zooms in again and displays a map pin on a central location in that city. Then, the user specifies his zip or postal code and the map zooms in further and the map pin is redrawn to reflect a central location within that zip or postal code. (The method here is generally one of "zooming in" on the user's location, so the system might not zoom in if, for example, the zip code covers a larger geographical area than does the city or town already specified. In such a case, the zip code corresponds to a larger geographical area and so the map might not be updated.) The user lastly enters his street address, and the map is updated, zooming in and placing the map pin as close as it can to the user's specified location.

Again, it is to be recognized that the particular implementation of specification of location 300 described immediately above is one very particular implementation of the specification of location 216 of the embodiment. As long as the user is able to specify his position in some way, he can benefit from features of the embodiment that can use this specification.

If the user provides such a specification of location 216 (FIG. 2), the system will be able to tailor certain aspects of the embodiment to the user's location. For example, the functions of the local website 400 (FIG. 4) could provide results sorted by distance, driving distance, or maximum driving time; and/or provide directions to something for which a user is looking. The user could also, for example, sort community websites 500 (FIG. 5) in find community websites 202 (FIG. 2) or individual public websites 600 (FIG. 6) by distance from his location.

In addition to and/or in conjunction with specifying his location, the user might specify a geographical area that is to be considered for his present purposes. This can be done by specifying a location and one or more distance- or location-related parameters (for example, a search radius, maximum driving distance, or maximum driving time). Alternatively, the user might select a geographical area by choosing one or more areas from, for example, a list and/or map of neighborhoods, cities, or states. Alternatively, the user could select a geographical area visually by drawing a circle or other shape on a map which defines the boundaries of the area he would like to consider. Some combination of these methods could also be used. For example, the user might specify his location and then draw a shape around the location that defines the geographical area; he could specify a location and a radius and get a visual confirmation on a map of the area he has thereby specified; or the two methods could be combined so that the field in which the radius is specified is updated as the map changes and vice-versa. Alternatively, or in addition to and/or combination with the above methods, the user might choose areas (for example, one or more neighborhoods, cities, counties, states) that determine a geographical (or geo-political) area. As long as the user is able to specify a geographical area in some way, specification of geographical area 206 (FIG. 2) will work in conjunction with features of the embodiment that can use this specification.

If the user provides such a specification of geographical area 206 (FIG. 2), then the system can provide results that are tailored to the geographical area thereby specified. That is, specification of geographical area 206 (FIG. 2) enables the system to provide certain functionality and/or content to the user based on the area specified. For example, the functions of the local website 400 (FIG. 4) could show results restricted to the geographical area, the user could search for community websites 500 (FIG. 5) within the specified area when using find community websites 202 (FIG. 2), the user could search for the individual public websites 700 (FIG. 7) of users located in the specified area, etc.

The user can re-define what is local for his purposes and circumstances at any time by specifying or re-specifying a geographical area. This allows the user (1) to define what he considers local and (2) to do so even if what is suitably local to the user changes, even quite frequently (for example, depending on his circumstances or what he is trying to accomplish during a particular time he is using the embodiment).

Figure 4:
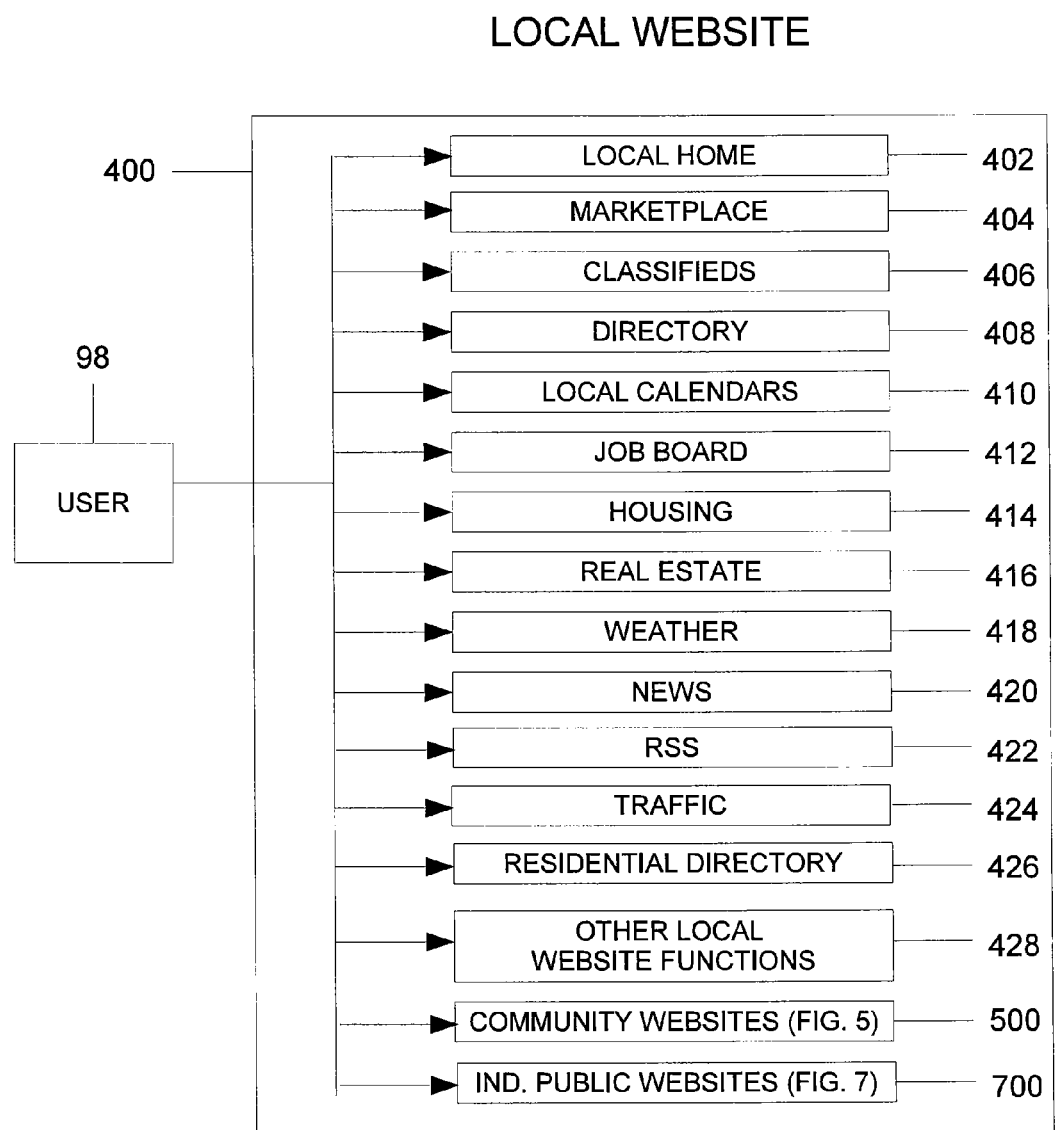
FIG. 4 is a diagram that illustrates functions of the local website in an embodiment of the invention.

A geographical area might be specified for all of the functionality of the embodiment for which such a specification is useful, a subset of all of the functions of the embodiment, and/or individual functions of the embodiment. For example, if the specification of geographical area 206 (FIG. 2) is made by using specification of location 216 (FIG. 2) and also specifying a search radius from that location, a single search radius could be used for the entire system. Alternatively, a different search radius could be applied to different parts and/or functions of the system. That is, the search radius for the classifieds 406 (FIG. 4) function of the local website 400 (FIG. 4) could be maintained independently of the search radius for the Marketplace function of the local website 400 (FIG. 4), although they could be set to be the same via an option to set the search radius for the entire system or for the entire local website 400 (FIG. 4). Any combination of setting of such location- or distance-related information at any combination of such different levels of the system might be offered.

FIG. 4 represents the local website 400 part of the embodiment. The local website is a set of functionality oriented toward the needs for commerce, communication, information and/or other needs of the user in his local (per his specification as discussed above) community.

Local home 402 is a place for integration of content and functionality from various functions of the local website 400 and from elsewhere in the embodiment. For example, the user might see any combination of items from marketplace 404, classifieds 406, one or more local calendars 410, weather 418, news 420, and/or other functions of the local website 400. Any combination of content and/or functionality from other parts of the embodiment such as find community websites 202 (FIG. 2), community websites 500 (FIG. 5), individual private website 600 (FIG. 6), and/or individual public website 700 (FIG. 7) could also appear here. The user can have the ability to customize what content and/or functionality is accessible on local home 402.

Marketplace 404 is a place where a user can buy and/or sell goods or services within an area defined as local by the user for his present purposes (which might be as large an area as the whole world) via specification of location 216 (FIG. 2). What exactly the user considers local or "nearby enough" for his present purposes is up to the user to define. The user might not specify his location. In such a case, the marketplace 404 effectively becomes a global marketplace for the user. The user might also specify his location but not any additional location- or distance-related parameters so as to not limit the results he gets in searching the marketplace 404 and/or to take advantage of location- and distance-related functionality. For example, the user can see how far away items in the marketplace 404 are located (or might be able to see an estimate of driving distance or driving time to items). In addition, if the user has specified his location, the system can restrict search results to only those items that can be delivered to the user. Instead of or in addition to specifying his location, the user might specify a geographical area, thereby defining what is local for her given what she is trying to do at the time (for example, locate a product that she can pick up that is within a certain number of miles of her current location). Results can then be limited to only those items that meet the parameters specified by the user.

This discussion of the synergy among the specification of location 216 (FIG. 2), the specification of geographical area 206 (FIG. 2), and the marketplace 404 is meant to be illustrative of the synergy among the specification of location 216 (FIG. 2) and specification of geographical area 206 (FIG. 2) and the various other parts of the website for which location- and distance-related information is potentially useful to the user. For example, the specification of location 216 (FIG. 2) and specification of geographical area 206 (FIG. 2) can be used in a similar fashion to that in which it might be used in the marketplace 404 for each of the components of the local website 400 (for example, in local calendars 410, classifieds 406, directory 408, job board 412, housing 414, real estate 416, weather 418, news 420, residential directory 426, etc.), in find community websites 202 (FIG. 2) or find individual public websites 208 (FIG. 2).

In this approach, Classifieds 406 is a classified ads system. Directory 408 is a "yellow pages"-type directory which might include or be associated with a system of reviews and/or ratings for the entries in the directory 408. It is contemplated that the user can be able to enhance his listing in the directory 408 in various ways, to connect it with a community website 500 (FIG. 5), or integrate it with a store 526 in a community website 500 (FIG. 5) through which he could sell goods or services. The directory 408 can include real-time (or close to real-time) information about its listings. That is, if a user is looking for a taxi, the user can be able to see where some or all of the taxis in the area are (possibly only if they are available), thereby getting information that is hopefully relevant to what he is seeking at that time. In a store 526, inventory levels could be maintained so the user can see what products are available for pickup or delivery. So, the directory 408 (and related functions such as the store 526) might have the usual, relatively static information about business such as its address and phone number as well as rather dynamic information about such things as the availability of products and/or services.

Local calendars 410 is a set of one or more local (as always, per the user's definition) calendars. Users can post events in one or more of these calendars or view events occurring locally. A user who posts an event to a calendar in a community website 500 (FIG. 5), individual private website 600 (FIG. 6), or an individual public website 700 (FIG. 7) can be given the option of also posting the event to one or more local calendars 410.

Figure 5:
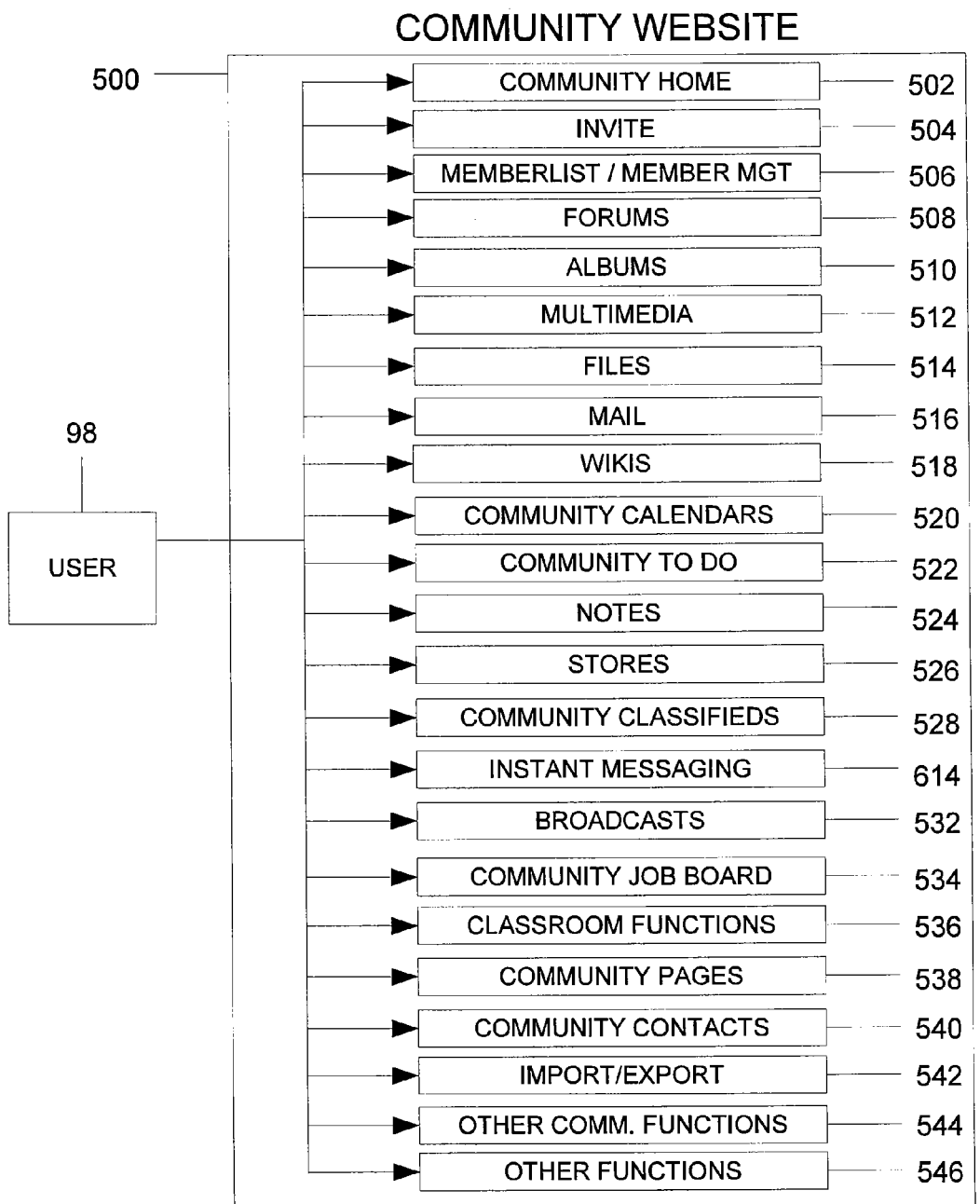
FIG. 5 is a diagram that illustrates functions of the community website in an embodiment of the invention.
Figure 6:
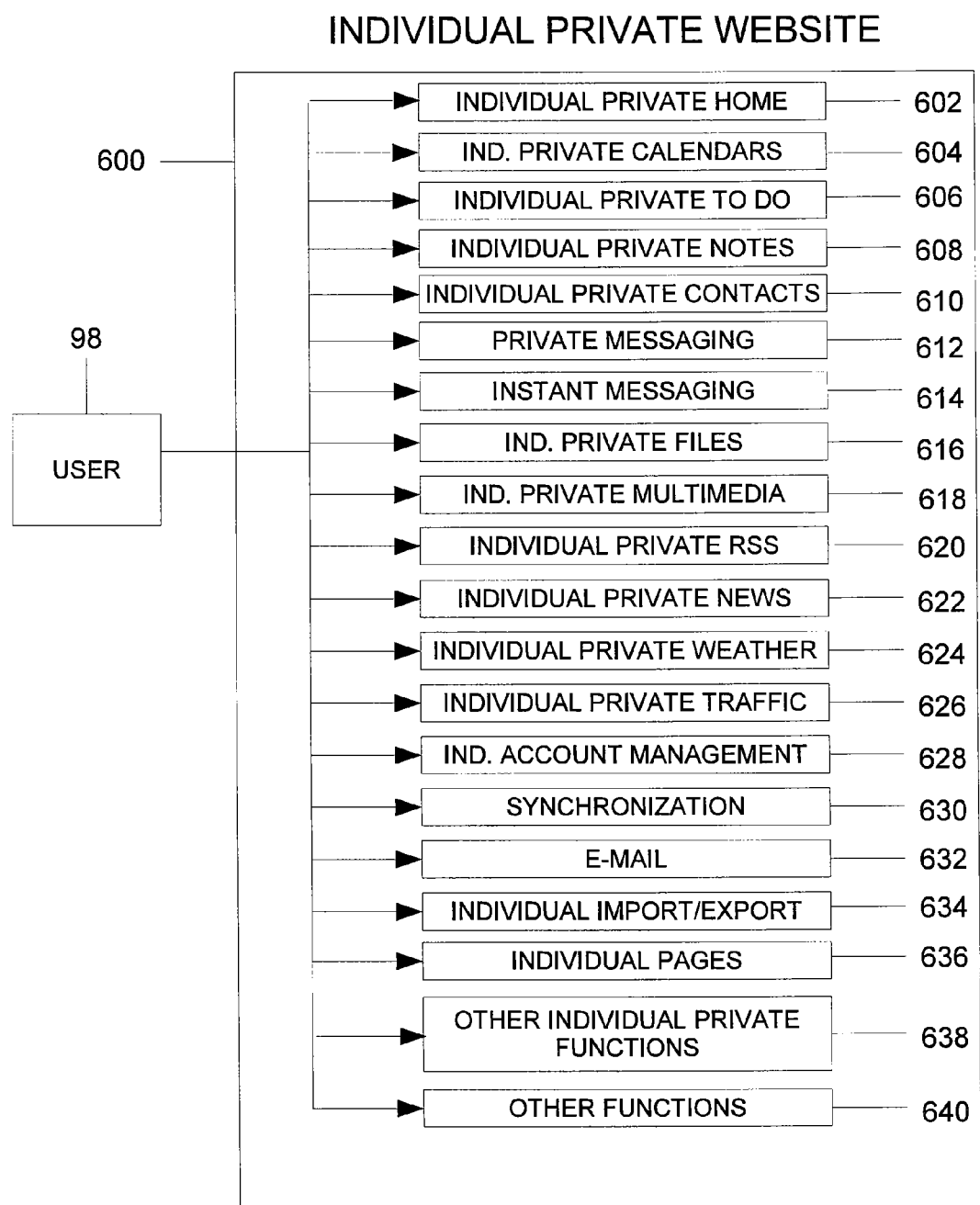
FIG. 6 is a diagram that illustrates functions of the individual private website in an embodiment of the invention.
Figure 7:
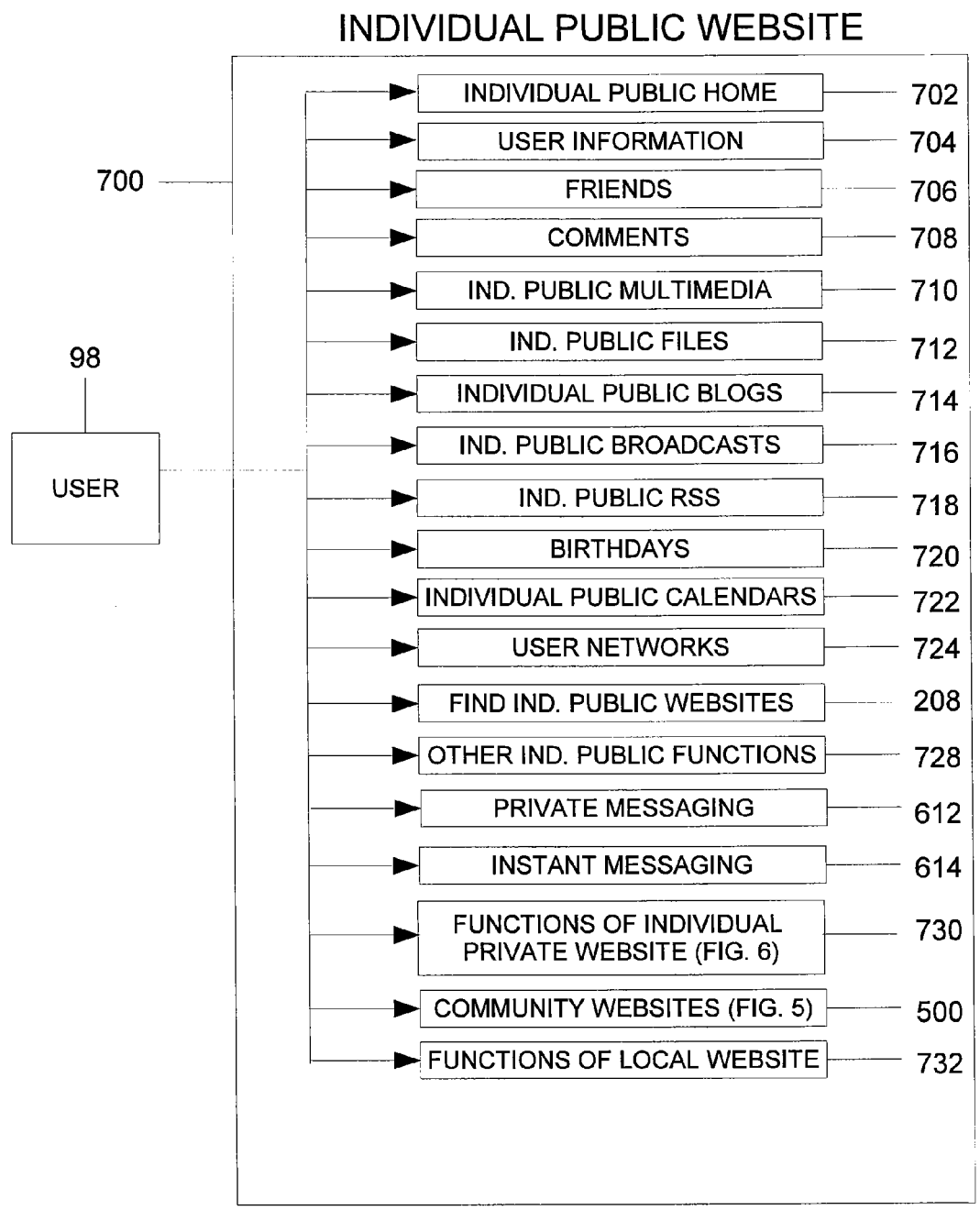
FIG. 7 is a diagram that illustrates functions of the individual public website in an embodiment of the invention.

In a contemplated embodiment, there are also community calendars 520 (FIG. 5), individual private calendars 604 (FIG. 6), and individual public calendars 722 (FIG. 7). An aspect of the embodiment is that the various calendars can be integrated. A user of the system can "subscribe" to one or more local calendars 410, community calendars 520 (FIG. 5), individual private calendars 604 (FIG. 6), or individual public calendars 722 (FIG. 7). This allows the user to see any one or more such calendars in a single view, possibly along with one or more of his own individual private calendars 604 (FIG. 6)

and/or easily access any of these calendars from his individual private website 600 (FIG. 6). Similarly, the community calendars 520 (FIG. 5) of one community website 500 (FIG. 5) could subscribe to any combination of one or more local calendars 410, community calendars 520 (FIG. 5), individual private calendars 604 (FIG. 6), or individual public calendars 722 (FIG. 7) thus providing integrated access to various calendars in a centralized location in the community website 500 (FIG. 5). Similar integration among the calendars can occur in individual public calendars 722 (FIG. 7). The user can also set reminders so he can be alerted to upcoming events. This reminder system can be extended to calendars to which the user has subscribed.

This model of subscription applies not only to the calendars of the various websites of the embodiment, but also to other aspects. For example, each local website 400, community website 500, individual private website 600, and individual public website 700 have (in addition to calendar functions) to do list, contact management, and notes management functions. A subscription model analogous to that used for the calendars is used for each of these. For example, a user can subscribe to all or part of community contacts 540 of one or more community websites 500 and/or to all or part of one or more individual private contacts 610 of the individual private websites 600 of other users. In this way, the user can then access and/or manage all or selected subsets (as he chooses) of the contacts from all of these sources as well as his own individual private contacts 610 in a single user interface in his individual private website 600. The analogous subscription model applies to do lists, notes, and might well also apply to other aspects of the embodiment.

Job board 412 is a job board on which employers can post jobs and/or other information about their company relevant to employment, job seekers can post resumes and/or other information about themselves relevant to employment, employers can search and access such information posted by job seekers, job seekers can search and access such employer information, etc. The job board 412 could also include various other functionality and content related to jobs, careers, finances, etc.

Housing 414 is for landlords, people looking to rent or lease property, people looking to sublet, and/or for roommates. Users can post information about properties or space available or desired, contact the posters of such information, etc.

Real estate 416 is where sellers or realtors can post listings of properties for sale and users can search and access such listings and/or MLS (Multiple Listing Service) listings. It might include a variety of related information, for example, on finances, mortgages, tips on finding a property, inspections, home maintenance, etc.

Weather 418 is the local weather, updated according to the user's specification of location 216 (FIG. 2), if the user so chooses. News 420 is news that might, if the user so chooses, be tailored according to his specification of location 216 (FIG. 2) and/or specification of geographical area 206 (FIG. 2). RSS 422 offers an ability to access RSS feeds or various other data sources. This could be used to get local information, although it doesn't have to be used for that purpose. Traffic 424 gives the user updates on traffic in his local area (of wherever he specifies). Residential directory 426 is a "white pages"-type electronic service. Moreover, other local website functions 428 indicates that additional functionality can be added to the embodiment.

Community websites 500 indicates that the user can also go to community websites 500 that are local to him (again, per his definition via specification of location 216 (FIG. 2) and/or specification of geographical area 206 (FIG. 2)). The local website 400 might also provide functionality that displays a listing of such community websites 500 automatically (rather than the user having to go to find community websites 202 (FIG. 2), for example, on local home 402).

Similarly, individual public websites 700 indicates that the user can also go to individual public websites 700 that are local to her. For example, the local website 400 might display a listing of such individual public websites 700 on local home 402.

Although the various components of the local website 400 have been discussed separately, this should not be taken to imply that these components are to be accessed by the user only as separate systems. Much content and/or functionality might be integrated within the local website 400 and/or across various parts of the site, including but not limited to sidebars and other navigational elements of the system, local home 402, community home 502 (FIG. 5), individual private home 602 (FIG. 6), and/or individual public home 702 (FIG. 7).

As with the rest of the "websites" that are part of the overall embodiment, it is by no means the case that every function of local website 400 discussed above must be implemented to have a local website 400. Aspects of the embodiment are found in combinations of any one or more functions. For example, the following are aspects of the embodiment: (a) marketplace 404 and any one or more other functions; (b) classifieds 406 and any one or more other functions; (c) directory 408 and any one or more other functions; (d) directory 408 and classifieds 406; (e) directory 408 and marketplace 404; (f) directory 408, marketplace 404, and classifieds 406; (f) marketplace 404 and local calendars 410; (e) marketplace 404, classifieds 406, and local calendars 410; (f) classifieds 406, local calendars 410, and job board 412; etc. Similar combinations of functionality from various parts of the invention form aspects of the invention that provide a benefit to the user by being available through a single system and/or working in concert to provide benefits greater than the pieces would provide individually. This occurs, for example, between or among functions of each of the "websites" of the embodiment, as well as, between or among functions of any of the "websites" or other parts of the embodiment.

An aspect of the embodiment is a system of permissions that allows users with appropriate permissions in a community website 500 (FIG. 5) or the owner of an individual public website 700 (FIG. 7) to control who can access which functions and features of the website in question. It is an aspect of the present invention that access can be controlled (permissions can be set) down to the level of each feature of the system. For example, if a forum 508 (FIG. 5) is organized into sub-forums, then, for each feature in the sub-forum—for example, the ability to view topics, read posts, post new topics, reply to posts, vote in polls, create polls, post an announcement, post other special types of posts (for example, "sticky posts"), etc.—the ability to access that feature can be limited to only those users specified as being able to do so. It is, however, also an aspect of the embodiment that access can be controlled at higher levels in the system. In one approach, all of the permissions for a sub-forum could be set at once for common situations. Alternatively or in addition, permissions could be set at as high a level as the entire community website 500 (FIG. 5) or even sets of community websites 500 (FIG. 5).

Users of the embodiment can be placed into users groups by users of a community website 500 (FIG. 5) having appropriate permissions or the owner of an individual public website 700 (FIG. 7). Then, an entire user group can be given permissions to access a set of one or more features.

The aspects of the present invention which involve a user accessing a feature of any community website 500 (FIG. 5), individual public website 700 (FIG. 7), or individual private website 600 (FIG. 6) can be effectively qualified by the system of permissions. The user must always have the appropriate permissions to perform whatever action he is performing. (Permissions are generally less of an issue with local website 400 (FIG. 4) because it is typically available to all users of the system.)

FIG. 5 illustrates a community website 500 of the present invention. A community website 500 is a set of functionality oriented toward the needs for communication, information, collaboration, data sharing and/or other needs of a community. The embodiment includes any number of community websites 500. Users can create a community website 500 for any community they wish, or use any of the community websites 500 that already exist (as always, assuming they have the appropriate permissions).

Community home 502 is where often, by default, users can go when they enter a community website 500. This is a customizable page that can be tailored to the needs of the community and/or the desires of users having appropriate permissions. As an entry point to the community website 500, it is typically used to provide information about the community website 500 and/or the community it supports, guide users to certain functionality and/or content in the community website 500, and/or to integrate content and/or functionality from around the community website 500 or other parts of the embodiment.

Invite 504 allows the user to invite others to visit or become members of the community website 500. This might be accomplished, for example, by e-mail, private messaging 612 (FIG. 6), or instant messaging 614 (FIG. 6).

Memberlist/member management 506 facilitates requests for membership in the community website 500, viewing of a list of users and user groups associated with the community website 500, granting of permissions to users or groups of users of the community website 500, placing of users into user groups associated with the community website 500, etc.

Furthermore, forums 508 represents one or more forums (aka bulletin boards, discussion boards) that can be part of a community website 500. Albums 510 represent one or more systems for the management, sharing, display, etc. of files. Albums allow users to upload, download, label, organize, view, etc. files. Such a file sharing system might be subdivided, for example, into multimedia 512 primarily for use with images, audio, and video, and files 514 primarily for use with other types of files and/or any types of files. Alternatively, files 514 could manage all the files, including those to be used in multimedia 512, which would then serve the purpose of presenting some or all of the files of appropriate types (for example, audio, video, images, photos) in a visually appealing and functional manner to the user. These same functions could be part of the other websites of the embodiment as well.

Mail 516 is a system that enables the broadcast of messages to all or some members of a community website. This might be handled, for example, by e-mail, Private Messaging 612 (FIG. 6), or instant messaging 614 (FIG. 6).

Wikis 518 represent one or more document creations systems. Wikis 518 allow one or more users to create and edit documents. Documents can be edited multiple times by multiple users. Typical uses of wikis 518 are for group collaboration and/or presentation of documents to community website 500 users.

Community calendars 520 represent one or more calendars. As discussed above, an aspect of the embodiment is the integration of the various calendars of the embodiment. A community calendar 520 can subscribe to any other type of calendar (e.g., community calendars 520, local calendars 410 (FIG. 4), individual private calendars 604 (FIG. 6), individual public calendars 722 (FIG. 7)). This provides easy access to these calendars and the ability to view and/or manage multiple calendars in a single view or user interface.

Community to do 522 allows users of a community website 500 to create, edit, and manage one or more "to do" or tasks lists. Tasks can be assigned to users, deadlines assigned, completion of tasks tracked, etc. Individual private to do 606 (FIG. 6) can be integrated with community to do 522 so that users can see and/or easily access all of their tasks in one place.

Notes 524 allows users of a community website 500 to create, edit, and manage one or more sets of notes. Stores 526 is a set of one or more stores that enables users of the community website 500 to buy and/or sell goods and/or services. Community classifieds 528 is one or more classified ad systems for the community(-ies) served by the community website 500. Instant messaging 614 (FIG. 6) is an instant messaging or chat system for the users of the community website 500. The system could transmit text, audio, images, video, etc. Broadcasts 532 is a system for broadcasts from one or more users to one or more additional users. Such broadcasts might, for example, be of text, images audio, and/or video. Community job board 534 is a system similar to job board 412 of local website 400 (FIG. 4), but oriented toward the community served by the community website 500 (FIG. 5). (This community, could, for example, be a school, company, government agency, or other organization; part of any of these; a geographical or political area (for example, a city, town, neighborhood, state; etc.).)

Classroom functions 536 is a set of functionality geared toward classes and education. For example, it might include a grade book in which instructors could enter the grades of each student and the students could then access their individual grades by logging in to the system.

Community pages 538 allows for the creation of pages that can contain content specific to them as well as content and/or functionality drawn from various functions of community website 500 and/or other parts of the embodiment. This allows for the isolation of a specified set of content and/or functionality from the rest of the content and functionality of community website 500 and the embodiment in general and the presentation of this content into a single user interface customized according to the purpose(s) of the page. This might be used, for example, to gather all of the information related to a particular subject matter, group of people, or project into one place. For example, a page could be created that consist of some custom content specific to that page as well as content and/or functionality drawn from one or more community to do 522 lists, community calendars 520, local calendars 410 (FIG. 4), forums 508 or sub-forums of those forums, wikis 518 or selected wiki entries, files or directories from files 514, files from multimedia 512, etc. For example, one or more members of a community website 500 might want to create a page 538 devoted to a particular project. The page could contains a sub-forum of forums 508 for discussion of the project, a set of wiki entries from wikis 518 for collaborative work, a to do list from community to do 522 for managing the tasks of the project, a set of files from files 514 to be shared in working on the project, etc. Users can create to do items, notes, documents, files, content specific to the project right, etc. on the page on the fly or by specifying that content and/or functionality from various parts of the embodiment be integrated into the page in the desired location.

Community contacts 540 is a contact management system for community website 500.

Import/export 542 allows for the importing of data from and exporting of data to various file formats, systems, applications, etc. For example, the user could import calendar, notes, to do (tasks), contacts, etc. into the community website 500. This function, as with each of the functions in each of the websites that make up the embodiment, might also be used elsewhere in the embodiment (for example, in individual private website 600).

Other community functions 544 illustrates that other functions might be added to community website 500.

Other functions 546 illustrates that the community website 500 might be integrated with other functions of the embodiment, for example, functions of the local website 400 (FIG. 4), individual private websites 600 (FIG. 6), and/or individual public websites 700 (FIG. 7).

Aspects of the contemplated embodiment are various combinations of one or more functions in the community website 500. That is, the following combinations of functionality are aspects of the embodiment: (a) forums 508, albums 510 and/or files 514 and/or multimedia 512, and wikis 518; (b) forums 508, albums 510 and/or files 514 and/or multimedia 512, wikis 518, and community calendars 520; (d) forums 508, albums 510 and/or files 514 and/or multimedia 512, wikis 518, community calendars 520, and community to do 522; (f) stores 526 and any one or more other functions of the community website 500; (g) community home 502 in combination with any of (a)-(f); (h) any of these combinations plus one or more other functions of the community website 500. These are a just few examples of the various combinations of one or more functions of the community website 500 that are aspects of the embodiment. There are also similar combinations between functions of other parts of the embodiment outside of the community website that form aspects of the invention. This is the situation with all parts, functions, and/or features of the embodiment. Aspects of the present invention can be formed by various combinations of pieces of it. Such combinations form useful synergies for the benefit of the user.

It should be borne in mind that certainly not every community website 500 function described here or illustrated in FIG. 5 must be implemented to have a community website 500. A fairly small strict subset of the functionality can form a very useful community website 500. This is the case with all of the "websites" of the present invention. Small combinations of their functionality form very useful websites for the user as he participates in his communities. Also, a community website 500 or individual public website 700 (FIG. 7) might be set to be not visible so that it would not appear in search results (unless possibly if the user performing the search had appropriate permissions).

FIG. 6 illustrates functions of an individual private website 600. The system of the present invention can contain any number of individual private websites 600, each owned by a user of the system. An individual private website 600 is set of functionality oriented toward the individual user as an individual and as a member of the various communities to which she belongs to and/or participates in via the rest of the embodiment. The individual private website 600 servers the needs for information and communication of the user with others as well as a member of his communities.

Individual private home 602 is a system that integrates content and functionality from all around the contemplated embodiment of the present invention on behalf of user 98. This integration is an aspect of the embodiment. Here, user 98 can access content and/or functionality from around his individual private website 600 from any combination of one of more functions of the individual private website 600. In addition, user 98 can access content and/or functionality from other parts of the system. For example, here user 98 can see a list of activity in any community website 500 (FIG. 5) or individual public website 700 (FIG. 7) he was interested in, or content and/or functionality from the local website 400 (FIG. 4). This integration within individual private website 600 and across other functions of an embodiment of the system into a single user interface is an aspect of the embodiment.

Individual private calendars 604 is a set of one or more calendars. The user can also subscribe to one or more local calendars 410 (FIG. 4), community calendars 520 (FIG. 5), individual private calendars 604, and/or individual public calendars 722 (FIG. 7), thereby being able to view any combination of these calendars in one view, easily access any of these calendars, and/or get reminders of upcoming events in any of these calendars. The integration of the various types of calendars is an aspect of the present invention.

Individual private to do 606 is a system for maintaining one or more "to do" lists. Individual private notes 608 is a system for maintaining one or more sets of notes. Individual private contacts 610 is a system for maintaining contact information. Private messaging 612 is a private messaging system for communication between and/or among users of the embodiment. Instant messaging 614 is an instant messaging system for communication between and/or among users of the embodiment. Moreover, individual private files 616 is an area for storage, retrieval, and/or management of files similar to that of files 514 of community website 500 (FIG. 5).

Individual private multimedia 618 is a place where the user can store, organize, and access various media files (for example, images, audio, video). Individual private files 616 and individual private multimedia 618 could be part of a single system or that single system could be subdivided into specialized areas for particular sets of types of data. Individual private files 616 could manage all of the files and individual private multimedia 618 could be then used to give access to files of appropriate types to the user in a functional and visually-appealing way. These functions are analogous to those provided by albums 510, files 514, and multimedia 512 of Community Website 500 (FIG. 5).

Furthermore, individual private RSS 620 is a system for accessing RSS feeds and other data sources the user specifies as being of interest to him. Individual private news 622 provides access to news. The user can customize what he wants to see. This might be used in conjunction with specification of location 216 (FIG. 2) and/or specification of geographical area 206 (FIG. 2).

Additionally, individual private weather 624 displays weather information to the user. This is typically used in conjunction with specification of location 216 (FIG. 2). Individual private traffic 626 displays traffic information to the user, might be used in conjunction with specification of location 216 (FIG. 2) and/or specification of geographical area 206 (FIG. 2), and might be customizable by the user who specifies what roads, routes, areas, he was interested in being kept up-to-date on. Individual account management 628 is a system that allows the user to manage all aspects of his account in the embodiment.

Synchronization 630 allows the user to synchronize data he can access via the embodiment with other systems. For example, the user could synchronize his data with a software application, a mobile device, or another web-based application. This function (as with others throughout the embodiment) can be used in parts of the embodiment other than individual private website 600. Further (and as is also the case with the other functions of the embodiment) synchronization 630 might be further subdivided. For example, it might be subdivided into a function for mobile device synchronization and a function for software application synchronization (which might subsequently be subdivided into separate functions for different software applications and/or versions of software applications). This function might be implemented in a variety of ways. For example, it might be implemented through any combination of one or more software applications, browser plug-ins, web services, web-based applications, or web pages.

E-mail 632 is an system that can server the user by providing e-mail functionality, but can also integrate the user's e-mail from disparate systems so that it can be retrieved and otherwise processed in a single location. So, if the user has several e-mail accounts (for example, for personal use, work, school, etc.) the user can come to one place where she can handle all of her e-mail. This integration of e-mail from various e-mail systems is an aspect of the embodiment.

Individual import/export 634 allows for the importing of data from and exporting of data to various file formats, systems, applications, etc. For example, the user could import calendar, notes, to do (tasks), contacts, e-mail, etc. into his individual private website 600. This would allow for such data to be accessed and managed from any system which can access the embodiment.

Individual pages 636 is a set of one or more pages analogous to the pages of community pages 538 (FIG. 5). Individual pages 636 allow the user to create a page (or a set of pages) that contains the content specified by the user, whether that content be particular to that page or drawn from one or more functions of the embodiment. This allows the functionality of the embodiment to be brought to bear on a particular subject matter while providing access to all of the information and communication relevant to that subject matter in a single place.

Other individual private functions 638 indicates that the individual private website 600 can be further expanded with additional content and/or functionality.

Other functions 640 indicates that the individual private website 600 can be integrated with various other parts and/or functions of the embodiment.

As with the rest of the present invention, a variety of combinations of functionality within the individual private website and/or also with other functions of the embodiment form aspects of the embodiment. As with the rest of the contemplated embodiments, nowhere near all of the functions of the individual private website 600 need be implemented to form a very useful individual private website 600.

FIG. 7 illustrates functions of individual public website 700, a system geared toward communicating, sharing data and/or information, collaborating, and/or networking, etc. with other users. User 98 could either be the user who owns individual public website 700 or any other user who is visiting the owner's individual public website 700.

Individual public home 702 allows other users to access various aspects of individual public website 700 through one user interface. (As usual, permissions will dictate exactly which features each user can access.) Functionality and content from any one or more of the other functions of the individual public website 700 can be integrated here in a way that creates a focal point for the content and functionality of the individual public website 700 of one user, from the perspective of other users.

User information 704 is a set of information about the user, including, for example, name, username, occupation, location, education, interests, contact information, etc. Users can designate other users as "friends". Friends 706 is a system for handling this. A user can ask another user to be his Friend, approve or deny requests from other users to be his friend, view lists of friends, display such lists on his individual public home 702, etc. Comments 708 is a system that allows users to leave comments that are typically viewable on an individual public home 702.

Individual public multimedia 710 and individual public files 712 are systems that allow for storage of, access to, and management of various media files (e.g., images, audio, video) as in the case of albums 510, files 514, and multimedia 512 of the community website 500 (FIG. 5). Parts or all of individual private files 616 (FIG. 6), individual private multimedia 618 (FIG. 6), multimedia 512 (FIG. 5), or community website 500 (FIG. 5) might be accessible here.

Individual public files 712 is a system that allows for storage, access, and management of files. Part or all of individual private files 616 (FIG. 6) or files 514 from community websites 500 (FIG. 5) might be accessible here. Individual public multimedia 710 and individual public files 712 might be merged into a single system and/or user interface for sharing of any type of files, or could be split up in various ways into components specializing in certain types of files.

Further, individual public blogs 714 is a set of one or more blogs. Individual public broadcasts 716 is a system for broadcasting from one or more users to one or more other users. Broadcasts might, for example, be of text, audio, video, etc. Also, individual public RSS 718 is a system that allows the user to process and display data feeds of interest to her. Additionally, birthdays 720 is a system for tracking, announcing, and/or being alerted of birthdays.

Individual public calendars 722 is a set of one or more calendars. Parts or all of one or more individual private calendars 604 (FIG. 6), local calendars 410 (FIG. 4), or community calendars 520 (FIG. 5) might be published here. (Of course, appropriate permissions are required.)

User networks 724 is a system for networking with other users on the basis of pre-defined networks of people. For example, a user network might be set up for some part or all of a school, business, or other organization. Then, members of the communities corresponding to such user networks might interact with one another via their individual public websites 700 (and possibly also community website 500 (FIG. 5) or other parts of the embodiment).

Find individual public websites 208 is a search function that allow users to search and/or browse for the individual public websites 700 of other users (and, in particular, for individual public home 702 pages). Other individual public functions 728 indicates that other functions may be added to the individual public website 700. Private messaging 612 is an email-like system for communication between and/or among users. Instant messaging 614 is a live chat system for communication between and/or among users. Such a system could transmit text, video, etc.

Functions of individual private website 730 indicates that the user might decide to use various content and/or functionality from her individual private website 600 (FIG. 6) on her individual public website 700. Community websites 500 (FIG. 5) indicates that the individual public website 700 might provide content and/or functionality from and/or access to one or more community websites 500 (FIG. 5). (The same could be the case for local website 400 (FIG. 4).)

Functions of local website 732 is meant to indicate that the functions provided in the local website 400 (FIG. 4) could also be implemented in the context of the networks established through individual public websites 700. So, users could, for example, post an item for sale in the marketplace 404 (FIG. 4) and restrict visibility of that item to users that are in their network of friends, some subset of that network, all or some of one or more pre-defined networks to which they belong, etc. Similarly, another user might be looking for an item in the classifieds 406 (FIG. 4), a place to live in housing 414 (FIG. 4), or a job in the job board 412 (FIG. 4), but only want to see results of people in all or part of one or more of his networks. This same concept of restricting who can view listings, restricting what results are displayed, etc., according to the user's specification of all or part of his networks, can be applied to any function of the Local Website just as it can to any function of the user's individual private website 600 (FIG. 6). Another sort of way in which local website 400 (FIG. 4) functions could be used in the individual public website 700 is by integrating content and/or functionality from the local website 400 (FIG. 4) into the individual public website 700.

As with the rest of the system, a variety of combinations of functionality within the individual public website 700 and/or other functions of the various contemplated embodiments form aspects of the embodiment. As with the rest of the aspects of the contemplated embodiments, only a small subset of the functionality of the individual public website 700 need be implemented.

The various components of the present invention have been implemented in one particular way on ZedZone.com, parts of which are described below in conjunction with figures containing screen shots of the website. This specific example is illustrative of how one can build and use aspects of the present invention. This implementation is presented as one example of a way in which the present invention could be implemented and should not be construed as implying that this is the only way in which the embodiment could be implemented. In fact, it should be borne in mind that there are a wide variety of possible ways to implement the embodiment. Further, the discussion of this particular implementation should not be taken to imply that the embodiment requires or is limited to the features of this particular implementation.

ZedZone.com is implemented in a system that consists of a set of servers running Linux. A set of web servers run apache, a set of database servers run MySQL, and a set of file servers run NFS. (A web service such as Amazon S3 is an alternative to NFS that is being worked on too.) Software to facilitate the implementation has been implemented on each of these servers. ZedZone.com can be accessing using nearly any web browser, including popular ones such as Firefox, IE, and Safari, as well as those on mobile devices.

FIG. 8A is a screenshot that illustrates the combination of the following in a single user interface on ZedZone.com:

CommZones tab 802 allows the user to access the active CommZone's website (or find or create a CommZone) on ZedZone.com. CommZones are websites that can be created by users for any group or community they wish that provides a platform for communication, collaboration, sharing files, etc. for that group.

Local tab 804 allows the user to access the local website of ZedZone.com. The local website is a website oriented toward communication and commerce within a local community according to the user's definition of what is local and/or the geographical area the user wishes to consider for his present purposes.

My ZedZone tab 806 allows the user to access his My ZedZone website. My ZedZone is a website for the user that is oriented toward the management of the user's individual communication and information, and the management of the communication and information of CommZones of interest to the user as well as from the local website.

Active address specification area 808 offers access to an "active address" function by which the user can specify where he is located and thereby take advantage of functionality on the site that can benefit from having location information.

Figure 8B:
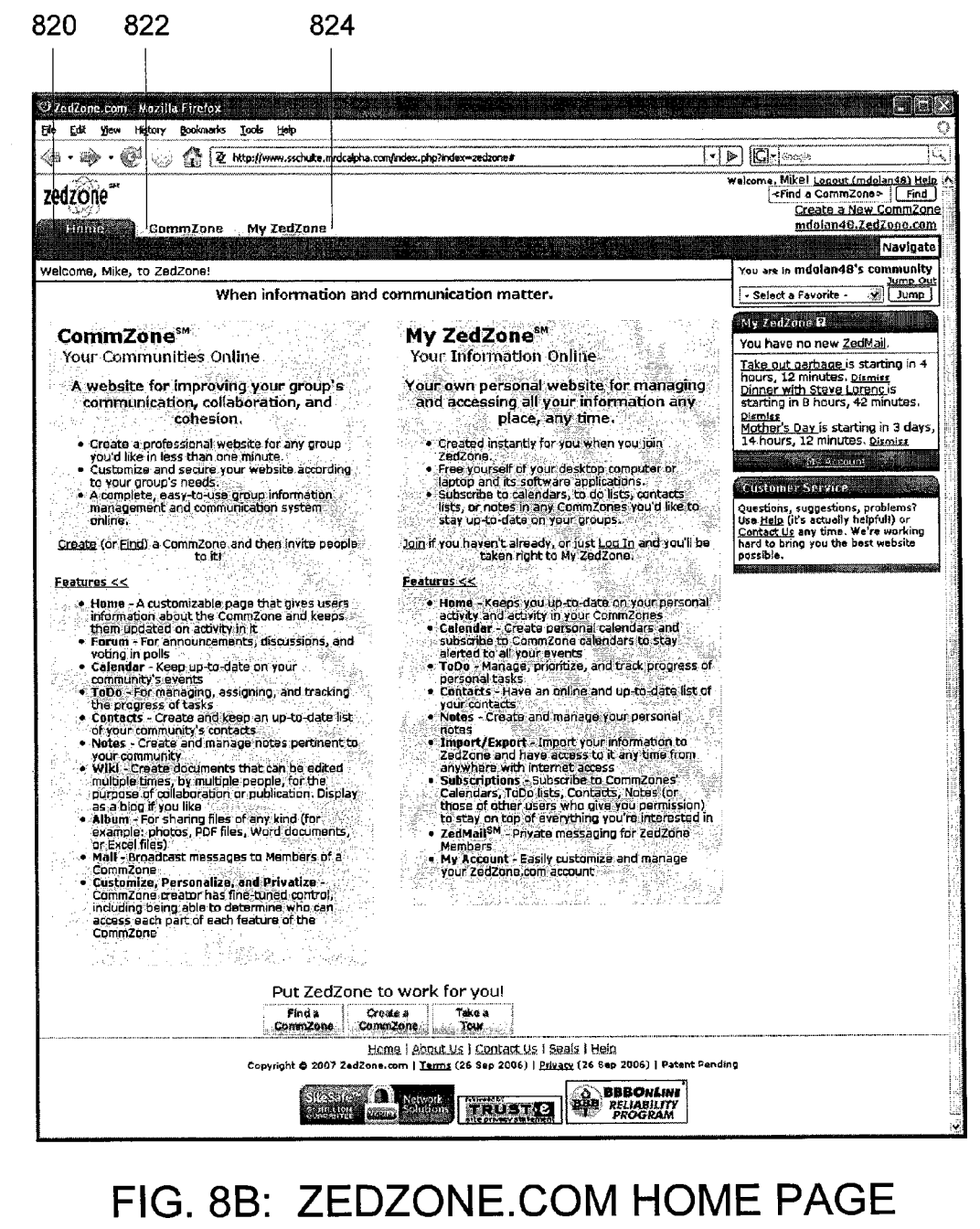

FIG. 8B is a screenshot of another version of a ZedZone.com home page that illustrates the combination of Home tab 820 which provides access to this home page for ZedZone.com as a whole (note the overview of some of ZedZone.com's currently implemented functionality), CommZone tab 822 which provides access to a CommZone website, and My ZedZone tab 824 which provides access to the presently logged in user's My ZedZone website.

FIG. 9 is a screenshot of the find a CommZone function of ZedZone.com. This function is accessed using the find form 902 (or just the button on that form) near the top right of ZedZone.com pages. Here, the user can browse the list of some or all CommZones in alphabetic order or in various other orders using sort 904 (in the left sidebar). (Note: The owner ("ZoneMaster") of a CommZone can specify that the CommZone not be visible is such searches.) The user can also restrict results to those CommZones that are within a specified distance of a location he specifies. This location can be the active address that appears (and can be set in) in the right sidebar or any other address the user has saved. (The active address and any number of other addresses the users wishes to store can be set and stored in My ZedZone.) The user can click on links displayed in the results of his search to access the home page of any CommZone, or any of its components directly. The user can also add any CommZone to a list of favorite CommZone's that is maintained as part of his account (in My ZedZone).

FIG. 10 is a screenshot of the create a CommZone page. Note that the user specifies the subdomain for his CommZone URL field 1002. This will dictate the URL by which users of the CommZone will access it. For example, if the subdomain specified is OurSite, then the CommZone's address will be OurSite.zedzone.com. The user also is prompted for name of the community for which the CommZone is being created in community name field 1004, can categorize or tag the CommZone in area of interest field 1006 and/or type of community field 1008, can enter a description of the community and/or CommZone in description field 1010, and can (optionally) specify an address in address fields 1012. These fields can provide users with information about the CommZone and can be searched on in find a CommZone (FIG. 9). An address entered for a CommZone facilitates the distance- and location-related functionality of find a CommZone (FIG. 9) and other functions of ZedZone.com that can use such information and might be integrated with a CommZone.

Figure 11A:
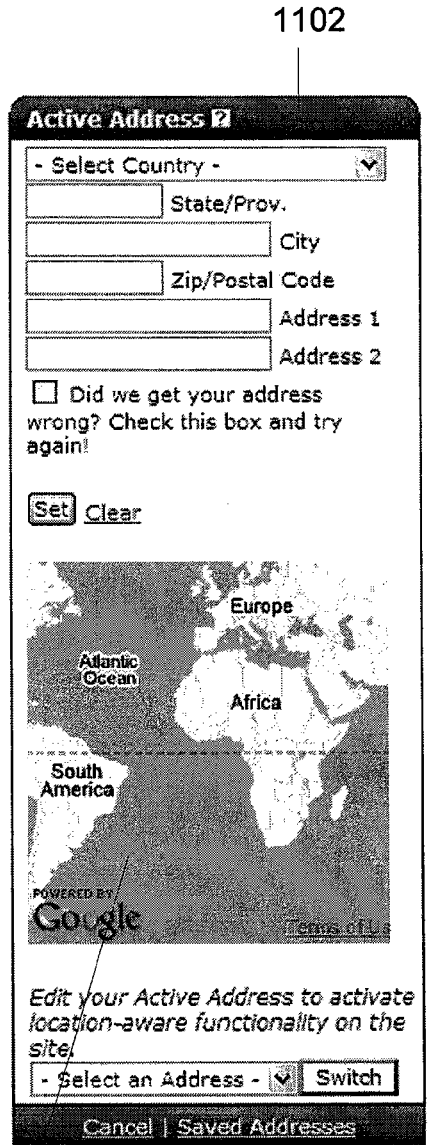
Figure 11B:
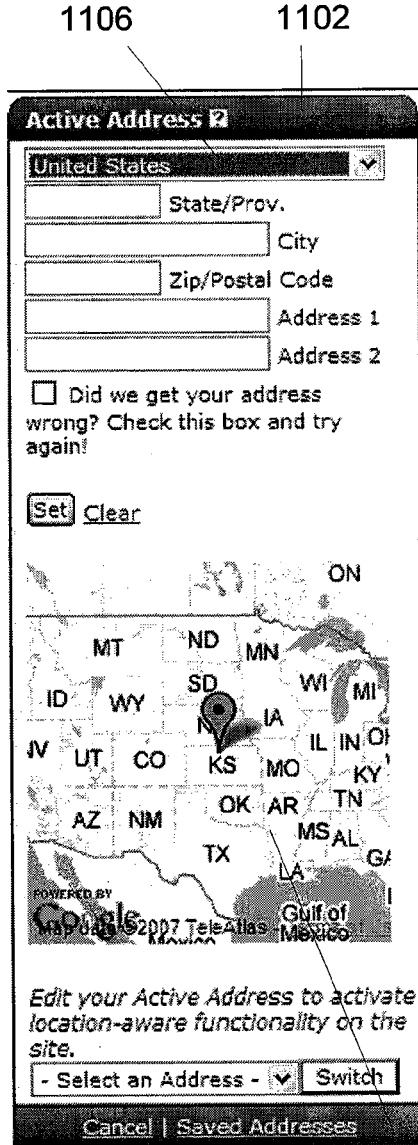

FIGS. 11A-F show a system way by which the user can specify his location. As the user specifies address fields in active address area 1102, map 1104 "zooms in" on his location and uses a "map pin" in map 1104 to show the location of the user, as best as the system can determine it given what data it has and what the user has specified. (This occurs in the right sidebar of ZedZone.com pages in an area labeled "Active Address".) FIG. 11A shows active address area 1102 before any location data has been specified. FIG. 11B shows active address area 1102 after the United States has been specified as the country in country field 1106. FIG. 11C shows updated map 1104 after Illinois has been specified as the state in state field 1108. FIG. 11D shows updates to map 1104 that occur once Chicago is specified as the city in city field 1110. After the zip code is entered in zip/postal code field 1112, map 1104 is again updated as shown in FIG. 11E. Finally, once the street address is entered by the user in address field 1114, map 1104 is updated, again zooming in and pointing to the user's location using the map pin as accurately as it can as shown in FIG.

11F. Once the user hits the "Set" button, the address is geocoded. This allows ZedZone.com to then offer the user functionality customized on the basis of his location. This is one particular way in which the user can specify his location. As long as the user can specify his location in some way, the rest of the functionality of ZedZone.com that can take advantage of location data can be utilized.

Figure 12C:
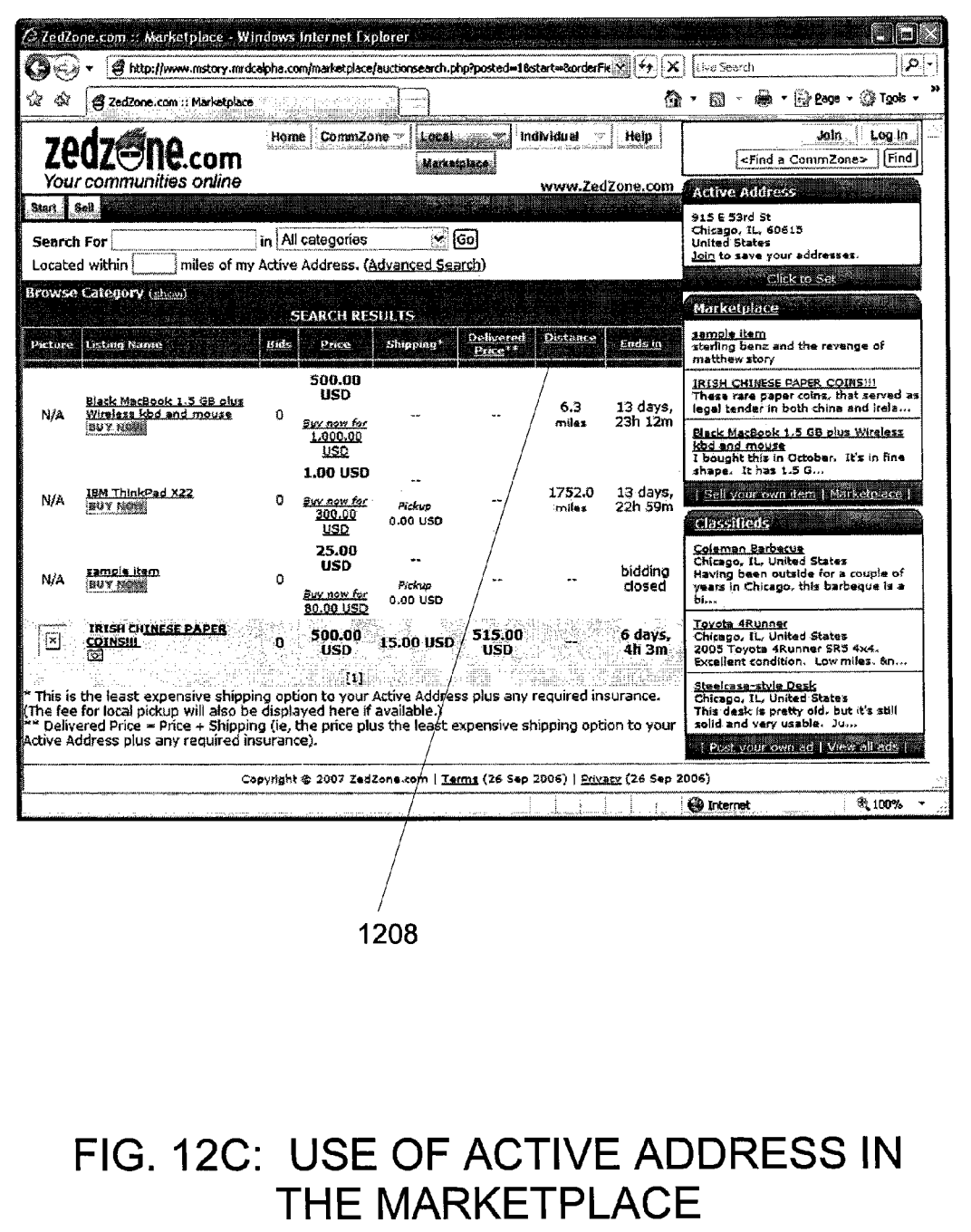

FIGS. 12A-G show examples of the active address used in conjunction with find a CommZone and the marketplace and classifieds functions of Local. When a CommZone is created or an item is added to the Marketplace or Classifieds systems, the user can specify a location to be associated with the CommZone or the item by entering an address, using his active address, or using a saved address. Then, when a user (typically a different user) searches for a CommZone or an item, that user can also specify a location (in similar ways). This allows the system to calculate the distance between this user and a the location that is associated with the CommZone or item (and possibly also perform other calculations such as driving time, driving distance, etc.). FIG. 12A shows the sorting of search results by distance relative to the user's active address in find a CommZone using distance feature link 1202 of sort 904. FIG. 12B shows the restriction of search results to those CommZones within a 10 mile radius of the active address using search radius field 1204 of find a CommZone. Other addresses can be specified and chosen at the time of search using address selection field 1206. FIG. 12C shows the sorting of search results in the marketplace by distance from the active address using sort by distance feature link 1208. FIG. 12D shows the use of search radius field 1210 in limiting search results to those marketplace items within a certain distance of the active address. FIGS. 12E and 12F show analogous uses of the active address and/or a search radius the classified ads.

FIG. 12G is a screenshot of a version of find a CommZone that offers another example of a way (in addition to using an address and a search radius) the user might specify a geographical area to be considered for the her present purposes on the site. In narrow search 1212, the user can "drill down" from the whole world to a country, and then further to a state and/or city as she wishes in order to limit her search results.

FIG. 13 provides an example of the integration that occurs among the various functions and content of ZedZone.com. In this case, the integrated functionality and content appears to the user in the right sidebar in marketplace display area 1302 and classifieds display area 1304. Here, the active address is used in conjunction with marketplace and classifieds systems. If the user has specified an active address in active address specification area 808 (or elsewhere), the items from the marketplace that are displayed in marketplace display area 1302 and classifieds display area 1304 do not include any items that can't be delivered to the user, while the classifieds items that appear are chosen based partially on the basis of proximity to the user's location.

FIG. 14A is a screenshot of the CommZone home page of a sample CommZone on ZedZone.com. Note the use of user-specified subdomain 1402, "Logic" (specified when the CommZone was created), in determining the address of the CommZone, "Logic.ZedZone.com". When a user goes, for example, to logic.zedzone.com all of the navigation below CommZone tab 802 is related to that CommZone. Note the following aspect of ZedZone.com: a user-specified subdomain is used for addressing the CommZone and each CommZone has its own dedicated user interface, while at the same time the user is still able easily access the overall system.

Figure 14B:
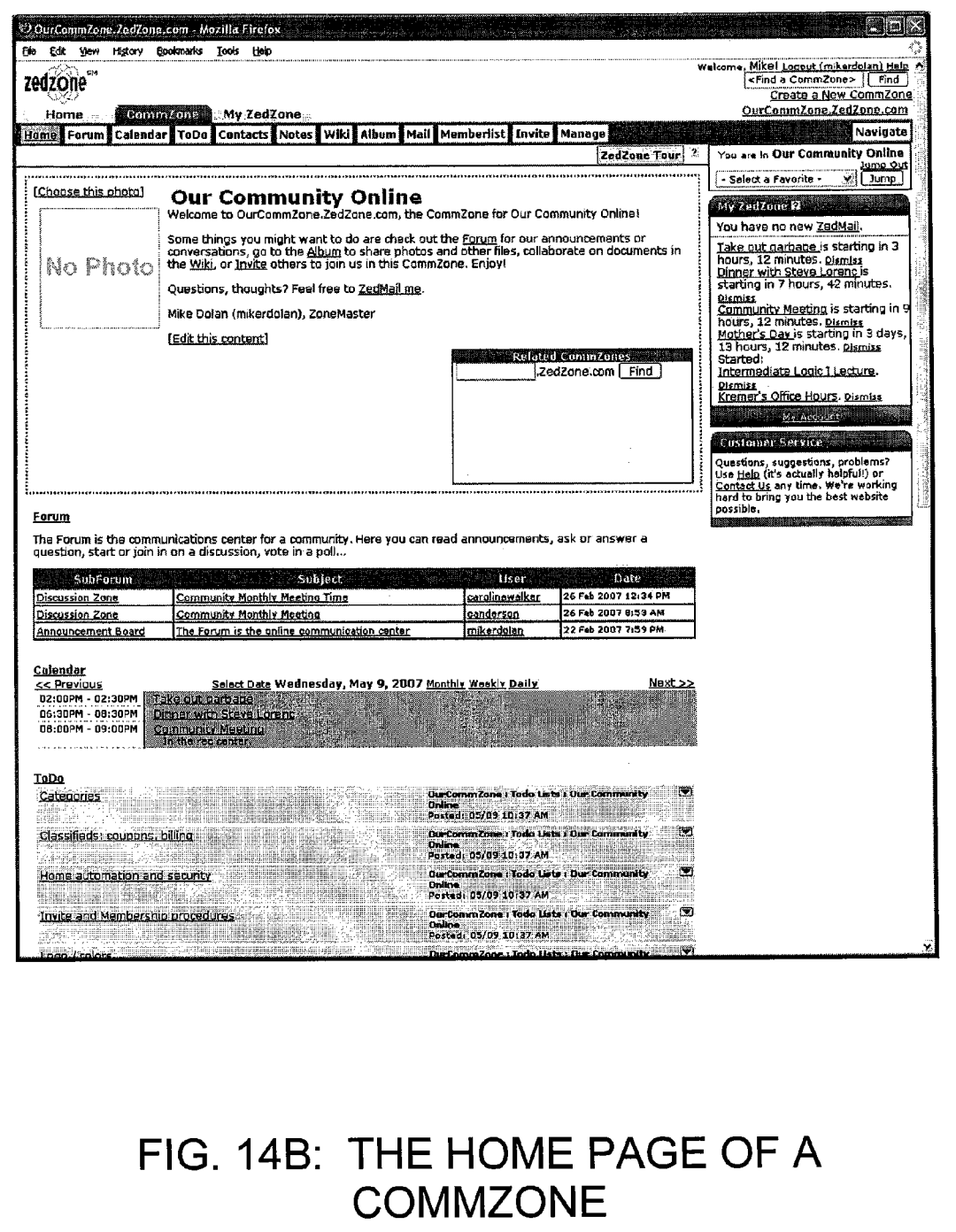

FIGS. 14B-C are screenshots of the CommZone home page of another sample CommZone on ZedZone.com. The CommZone functions that have been implemented so far are the following:

A forum ("Forum") for communication among CommZone users through announcements, discussions, voting in polls, etc.

A calendar ("Calendar") system of one or more calendars that can be organized into folders (as is typical on ZedZone.com) and used to manage the events of the group served by the CommZone and keep users updated on those events.

A system of to do lists ("ToDo") for managing the tasks of the CommZone (or the community associated with the CommZone) by maintaining lists, assigning tasks to users, tracking the completion of tasks, etc.

A contact management system ("Contacts") for managing contact information in a system that resembles an enhanced electronic address book.

A system for maintaining lists of notes ("Notes").

A system for creating documents collaboratively ("Wiki").

An album ("Album") for the sharing and management of files, display in a visually appealing format (including for multimedia files such as images or photographs), etc.

A system for broadcasting messages to all users ("Mail") via e-mail or ZedMail (a private messaging system for ZedZone.com users).

A system for accessing a list of members and managing who are the members and/or moderators of the CommZone ("Memberlist").

A system for customizing and controlling access in the CommZone ("Manage").

The content and appearance of the CommZone home page can be customized. Note the following aspect of the CommZone home page: it is a focal point for integration of content and functionality from around the CommZone as it can show content and/or lists of recent updates within different functions of the CommZone and allows easy access to those functions as well as content within them.

FIGS. 15A-E illustrate the use of the visibility setting, user groups, and permissions in a CommZone on ZedZone.com.

Figure 15F:
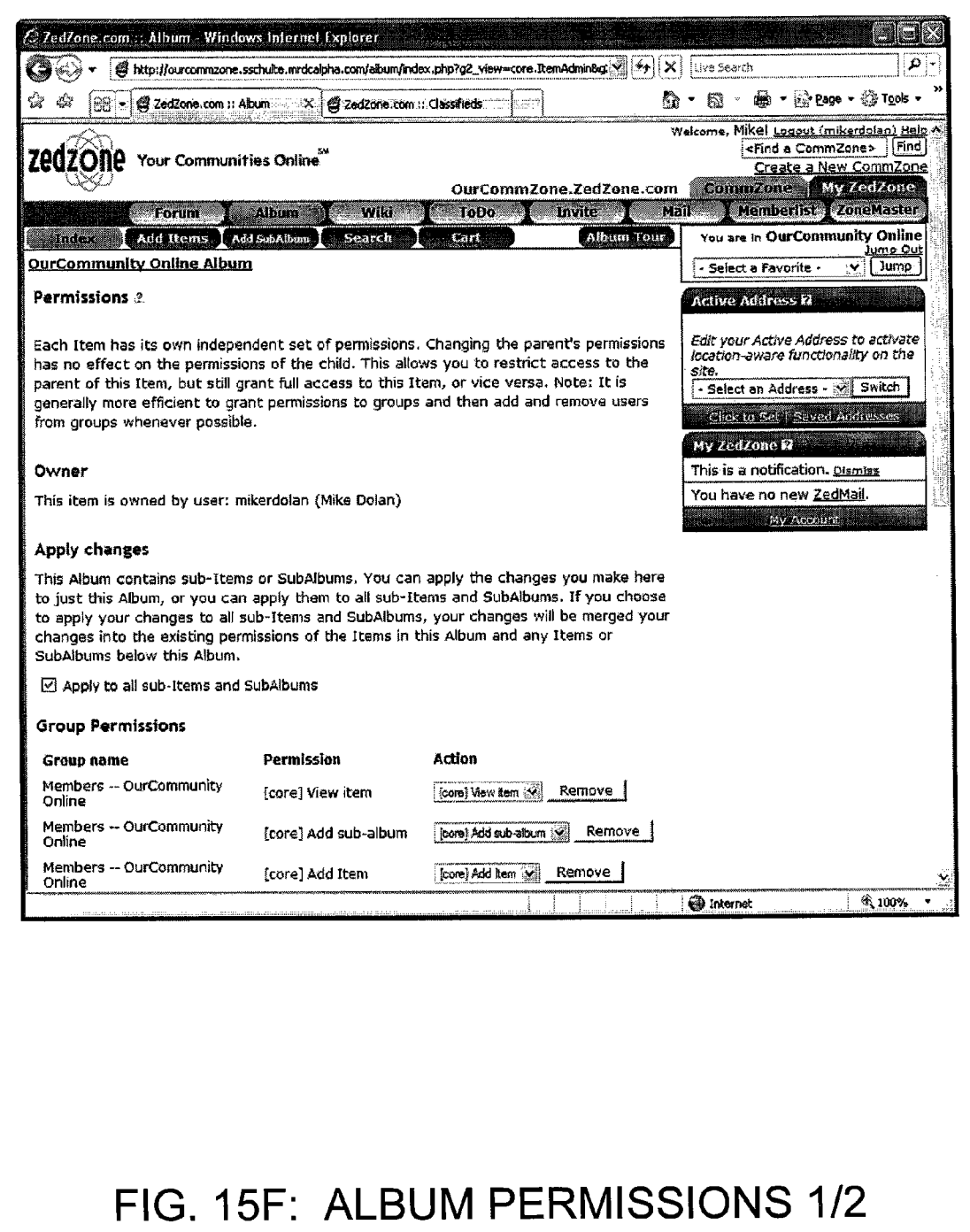

FIG. 15A-B are screenshots of the manage CommZone privacy page of a CommZone on ZedZone.com. This page allows the user (assuming, of course, she has appropriate permissions) to control who can see and do what in the CommZone at a fairly high level. In visibility section 1502, the user can set the visibility setting which controls whether the CommZone can be found via searches (using find a CommZone (FIG. 9), etc.) on ZedZone.com. In membership section 1504, a link to the manage CommZone membership page (FIG. 15B) is provided. That page allows, among other things, the placing of users into groups, a process that makes it easier to grant permissions to sets of users of the CommZone. (For example, users can be made members or moderators of the CommZone.) On the present manage CommZone privacy page, permissions can be granted to groups of users at the level of (a) each sub-forum in forum section 1506 (the forum is composed of (organized into) sub-forums), (b) the calendars in calendar section 1508, (c) the to do lists in to do section 1510, (d) the wiki in wiki section 1512, and (e) the album in album section 1514. However, permissions can also be set at the level of each individual feature in some of these areas by clicking on one of the "Customize" links, which takes the user to the appropriate detailed permissions page for the sub-forum, the wiki, or the album (FIGS. 15D-F).

FIG. 15C shows the manage CommZone membership page of a CommZone. Note that there are three groups of users: the ZoneMaster, listed in ZoneMaster section 1516; moderators, listed in CommZone moderators section 1518; and members, listed in CommZone members section 1520. The ZoneMaster of a CommZone (initially the creator of the CommZone, although this can be changed by the user) has access to every feature of it, moderators typically have access to fewer features than does the ZoneMaster, and members typically have access to fewer features than do moderators. Open/closed membership section 1522 of the present manage CommZone membership page allows the ZoneMaster to set the CommZone to be open for membership requests. If the CommZone is open for membership requests, ZedZone.com users can request membership in the CommZone. Then, the ZoneMaster can approve or deny such requests. The ZoneMaster of a CommZone can also make ZedZone.com users members of the CommZone by entering their usernames in add member 1524 section and can promote members to moderators in the CommZone by selecting one or more members and then selecting add moderator privileges button 1526. (The user can subsequently opt-out of membership if he desires.) (As with just about every feature of the CommZone, who can control which users are in which groups is limited to only those having the appropriate permissions in the CommZone. Typically, this function is reserved for the ZoneMaster, but he might be able to grant other users access to this functionality as well, although this has not been implemented at this time.)

FIG. 15D is a screenshot of the manage sub-forum for a sub-forum called "Discussion Zone". This page can be accessed by clicking on "Customize" next to the higher-level permission-setting dropdown list next to the "Discussion Zone" SubForum of FIG. 15A or through a CommZone management section in MyAccount (in "My ZedZone") called "ZoneMastering". The ZoneMastering section of MyAccount allows the ZoneMaster to control all aspects of his CommZone(s). Note that exactly which groups of users can see and do what in the SubForum can be controlled. For each feature of the SubForum, the ZoneMaster can specify whether anyone, members, or moderators can access that feature. See create polls dropdown 1528 for an example of this. (Note: Moderators and the ZoneMaster are considered members.) There are also "Prepackaged Permissions", accessible through prepackaged permissions dropdown 1530, which set all of the permissions for the SubForum for common situations. (These are also available at the higher-level Manage CommZone Privacy page of FIG. 15A.)

FIG. 15E is a screenshot of the wiki permissions page for the wiki of a CommZone (having the URL OurCommZone.zedzone.com). (This page can be accessed by following any of the "Customize" links in the "Wiki" section of the manage CommZone privacy page (FIG. 15A-B) or through the ZoneMastering section in MyAccount.) Note that, as in the case of the sub-forum of FIG. 15D, permissions can be set for each feature of the wiki. Wiki permissions are handled a bit differently than those for sub-forums, however. There are default permissions, which can be set in default entry permissions section 1532, that any new wiki entry (aka documents) inherits when it is created. Those permissions settings can be overridden, however, for any page the ZoneMaster (or, as usual, another user with appropriate permissions) chooses in individual entry permissions section 1536.

FIGS. 15F-G are screenshots of the album permissions page of a CommZone's album on ZedZone.com. As in the case of the sub-forum and wiki permissions (of FIGS. 15D and 15E, respectively), permissions can be set for each feature of the Album. In the Album, however, permissions can be granted to individual users in addition to user groups. (Such an ability has not yet been implemented on ZedZone.com in the other functions.)

Figure 16:
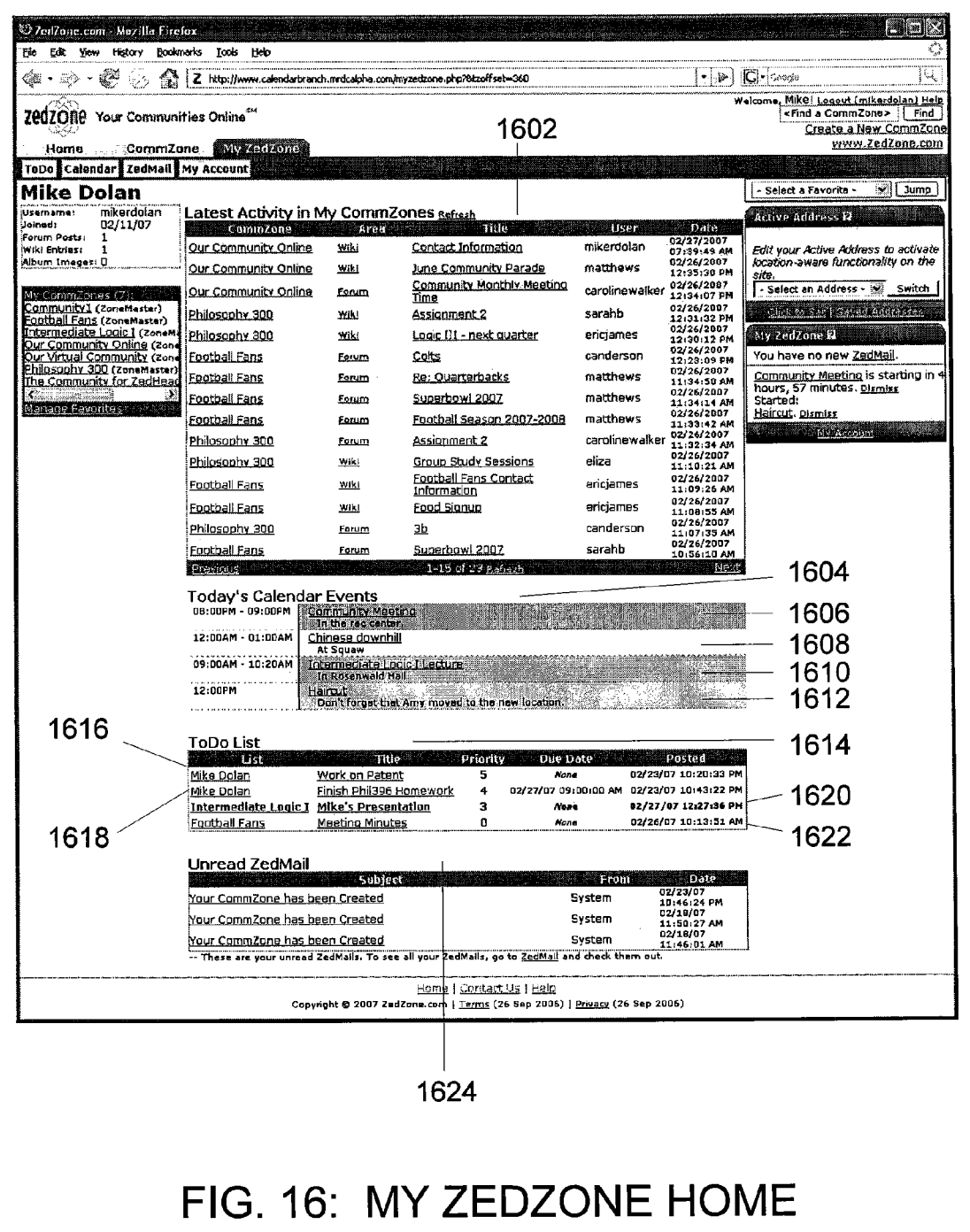

FIG. 16 is a screenshot of the My ZedZone home page of a user of ZedZone.com. Note the integration of content from various CommZones of the user's choosing and from around the various functions of My ZedZone. The latest activity in my CommZones section 1602 shows the latest activity in each of the CommZones this user has chosen to be kept up-to-date on. Today's calendar events section 1604 lists upcoming events from the user's own individual calendars as well as from the various calendars this user has subscribed to. (The user can subscribe (as usual, if he has appropriate permissions) to calendars in CommZones and/or the calendars of other users and can view and access the upcoming events of those calendars here (as well as in the Calendar section of My ZedZone).) In the screenshot, event 1606 is from a calendar in a CommZone, event 1608 of an event from the My ZedZone website of another user, event 1610 event from a calendar of another CommZone, and event 1612 is an event from one of the user's own calendars. In a similar fashion, to do list section 1614 lists to do items from to do lists the user has chosen to be kept up-to-date on. Here, there are two items from the users own to do list (items 1616 and 1618), and two items from to do lists found in CommZones (items 1620 and 1622). (Item 1620 is bolded to indicate that this task from a CommZone to do list has been assigned to the present user.) Unread ZedMail section 1624 shows a list of ZedMails that have not yet been read by the user. Note that My ZedZone is a personal website for the management of individual information and communication as well as integration of the content and functionality of the rest of ZedZone.com.

FIG. 17 is a screenshot of the "all" view of the calendar function of My ZedZone on ZedZone.com. The all view allows the user to see events any or all of his individual calendars and/or any or all of the events of the calendars to which he has subscribed (CommZone calendars or the calendars of other individual users, assuming in each case the that present user has the appropriate permissions). In this screenshot, event 1702 is a (repeating) event from one of another user's calendars, event 1704 and event 1706 are events from a calendar in a CommZone, event 1708 is an event from one of the present users individual calendars, etc. (These events appear in different colors (not visible here) depending on the calendar from which they were drawn.) A similar subscription model is available for each of ToDo, Contacts, and Notes. This model will likely be applied to other functions of ZedZone.com in the future. This is just one example of the integration of content and functionality from the various functions of My ZedZone and ZedZone.com.

FIG. 18 is a screenshot of the ToDo function of My ZedZone. The user can have an arbitrarily large number (at least for practical purposes) of ToDo lists and can organize them into an arbitrarily large number (again, at least for practical purposes) of folders. Similarly, CommZones can have an arbitrarily large number of ToDo lists and they can be organized into folders. The user can subscribe the ToDo lists of any number of CommZones he wishes. The user can select just which ToDo lists are displayed (using the checkbox system in the left sidebar). Here, the user has subscribed and is presently choosing to view the ToDo lists of one CommZone, "Our Community Online", as can be seen in Subscribed CommZones box 1802. The user has one personal ToDo folder containing one ToDo list and is presently choosing to view that list, as can be seen in ToDo Folders box 1804. In the center of the page, the currently selected lists are combined into a single list. The list from which each item has been drawn is indicated as in list indicator 1806, which indicates that the item listed comes from a ToDo list called "Our Community" in a folder called "ToDo lists" in a CommZone called "OurCommZone". ("OurCommZone" is actually the subdomain that uniquely identifies the CommZone. The Community Name of the CommZone, "Our Community Online" could be alternatively used. "OurCommZone" is being used just for the sake of brevity.) List indicator 1808 serves as another example. Here, the item is drawn from a personal ToDo list of the user. The item is in a folder called "Todo lists" and a list called "Personal". Items can be given due dates as is indicated by due date indicator 1810. Items can be assigned to users as is indicated by assignment indicator 1812. The list can be sorted in a variety of ways as indicated by sort dropdown 1814. The user can search the combined set of lists using search textbox 1816. Contacts, Notes, and Calendars share similar features including that there can be an arbitrarily large number of lists and/or calendars and these lists and/or calendars can be organized into folders, that users can subscribe to any number of CommZones' Contacts, Notes and/or Calendars and can thereby view and manage contacts and notes information through a combined user interface, that the lists and/or calendars can be viewed in a variety of sort orders in this combined user interface, that the user can choose which lists and/or calendars he is currently viewing, and that the user can search the combined set of lists and/or calendars.

FIG. 19 is a screenshot of the Contacts section of a user's My ZedZone website. Here, the user has one individual contacts folder 1902 called "Personal Contacts", and one contacts list 1904 inside of that folder called "Friends". The user can have as many such folders and lists within those folders as he wishes (at least practically). The user has subscribed to the Contacts of one CommZone as can be seen in Subscribed CommZones box 1906. That CommZone has one contacts folder called "Our Contacts" and in that folder is one contacts list called "Contacts". A ZedZone.com user can subscribe to the Contacts of as many CommZones as he desires (assuming, as always, that she has the appropriate permissions). The CommZone can have as many Contacts folders and lists as is desirable per the user's choice. The user can use the checkboxes in the left sidebar to choose which sets of contacts she wishes to view at the present time. Arrows or wedges next to folders, such as folder arrow 1908, indicate that the folder can be expanded or contracted on the page (to show or hide their contents). Arrows to the right of various items, such as action arrow 1910, give the user access to actions that can be taken on the corresponding item. The user can search using search box 1912 and can sort in various ways by using sort by dropdown 1914. Contact 1916 is a contact from this users individual contact list friends 1904 (and that the user is currently choosing to display). Contact 1918 is a contact from the contact list in the CommZone to which the user has subscribed (and is currently choosing to display). Tags box 1920 indicates that contacts can be tagged when added or edited. This allows the user to then select, using tags box 1920, to display only those contacts having the tag or tags selected. (Currently, only one tag can be selected, but this will likely be changed.) All of the features pointed out here have analogous features in Calendar, ToDo, and Notes in My ZedZone and could be implemented in other functions of My ZedZone. All of the features pointed out here regarding FIG. 19 have analogous features in the Contacts function of each CommZone as well as the Calendar, Notes, ToDo, and Notes section of each CommZone, with the exception that the subscription model is not currently implemented in the CommZone. Some or all of these features might well be implemented in other parts of the CommZone or elsewhere on ZedZone.com.

FIG. 20 is a screenshot of the Notes section of My ZedZone for the currently logged in user. Here, the user is viewing his Notes as cards, as seen in View Notes As box 2002. The user also has the option view his Notes as a list, using the radio button next to "List" in View Notes As box 2002. In this particular example in FIG. 20, the user has one individual Notes folder 2004 called "My Notes", and two Notes lists called "Personal Notes 1" and "Personal Notes 2" inside of that folder. The user can have as many such folders and lists within those folders as he wishes (at least practically). As with Contacts, the user has subscribed to the Notes of one CommZone, called "Our Community Online", as seen in Subscribed CommZones box 2006. Also in Subscribed CommZones box 2006, the user can see that that CommZone currently has two Notes folders called "Notes Group 2" and "Our Notes". Each of those folders has one or more Notes lists. As seen in Subscribed CommZones box 2006, the "Notes Group 2" folder has the "Set of Notes 1" list, and the "Our Notes" folder has the "Group Notes 1", "Group Notes 2", and "Group Notes 3" lists. A ZedZone.com user can subscribe to the Notes of as many CommZones as he desires (assuming, as always, that he has the appropriate permissions). Each CommZone can have as many Notes folders and lists as is desirable by the user or any user with the appropriate permissions for that CommZone. The user can use the checkboxes in the left sidebar to choose which sets of Notes she wishes to view at the present time. In the screenshot in FIG. 20, the user has chosen to check the boxes for the list "Personal Notes 1" from his My Notes folder 2004, as well as various lists from the Subscribed CommZones box 2006. Arrows or wedges next to folders, such as the folder arrow next to the "Personal Notes 1" list in My Notes box 2004, indicate that the folder can be expanded or contracted on the page (to show or hide their contents). Arrows to the right of various items, such as the action arrow for My Notes box 2004, give the user access to actions that can be taken on the corresponding item. The user can search using the search box, similar to the Contact search box 1912 from FIG. 19 and can sort in various ways by using sort by dropdown, similar to the Contact sort by dropdown 1914 seen in FIG. 19. In the screenshot in FIG. 20, the user shows seven notes. In the left side bar of FIG. 20 is a Tags box similar to the Contacts Tags box 1920 in FIG. 19, which indicates that Notes can be tagged when added or edited. This allows the user to then select, using the tags box, to display only those Notes having the tag or tags selected. All of the features pointed out here have analogous features in Calendar, ToDo, and Contacts in My ZedZone and could be implemented in other functions of My ZedZone. All of the features pointed out here regarding FIG. 20 have analogous features in the Notes function of each CommZone as well as the Calendar, Contacts, and ToDo section of each CommZone, with the exception that a user is, at the present time, not able to subscribe to a CommZone in its entirety.

Therefore, the present invention provides a flexible and interactive system facilitating the integration of our community-based lives. The contemplated system allows a user to define for himself communities based on any combination of geography, interest, similarity, and/or identity with a group, and to participate in those community through the use of a system that provides commerce, communication, collaboration, and information for that community. In addition, the system enables the user to manage his personal information and communications while also being able to benefit from the community-oriented functionality of the system, and to integrate content and functionality from all around the system into a user interface that meets his needs as an individual and as a participant in communities. Further, the system of the present invention enables the user to conveniently organize personal choice or participation information and to do so in an unique community that the user defines as well as provide a means to organize and facilitate convenient interaction between various users. Moreover, the present system can be configured to facilitate the organization and integration of our daily routines with other aspects of our lives and enhances our ability to communicate, collaborate, and share current data and information and is accessible from anywhere in the world via personal computers or other global devices.

Further additions, modifications and improvements may be made to the contemplated system without departing from the scope of the present invention. Moreover, the methods and approaches disclosed herein can be employed in any number of applications where the characteristics thereof are desirable. Accordingly, it is not intended that the invention be limited, except as by the appended claims.

I claim:

1. A computerized system of integrated communities, comprising:
- an information system including a display accessible by a user, the information system configured to receive content;
- a non-transmitting computer readable storage medium having stored thereon software including executable computer instructions and associated with a local website, a community website, an individual private website, and an individual public website defining functionality separate and distinct from that of at least the individual private website, the local, community and individual public websites including content shared with other users and the individual private website including displayable content created by the user intended to be secluded from sight, presence or intrusion of all others;
- a calendar which is integrated with each of the local, community, individual private and individual public websites;
- a "To Do List" which is integrated with each of the local, community, individual private and individual public websites;
- a user-specified subdomain which is used to create and access one or more of the local, community, individual private or individual public websites;
- a forum; an album;
- a Wiki;
- a mail function;
- a specification of location function;
- a specification of geographical area function;
- a find website function; an instant messaging function;
- an interactive map function;
- a search function;
- an internet search function; and
- a subscription mode;
- wherein separate and distinct permissions can be set for each of the local, community, individual private and individual public websites;
- wherein the software displays the local, community, individual private and individual public website on the display of the information system and the websites are integrated and are accessible via a single user interface such that one website allows access to one or more other websites and updates to one website may be reflected in another website and viewable via the information system and wherein one or more of the local, community, individual public, and individual private websites include a geographical aspect determined by a user's residence address.

* * * * *